US011290503B1

(12) United States Patent
Botner et al.

(10) Patent No.: US 11,290,503 B1
(45) Date of Patent: Mar. 29, 2022

(54) CALL SCREENING SERVICE FOR COMMUNICATION DEVICES

(71) Applicant: FIRST ORION CORP., Little Rock, AR (US)

(72) Inventors: Mark Hamilton Botner, Little Rock, AR (US); Collin Michael Turney, Benton, AR (US); Daniel Francis Kliebhan, Henderson, NV (US); Robert Francis Piscopo, Jr., Kirkland, WA (US); Charles Donald Morgan, Little Rock, AR (US); Jamelle Adnan Brown, Conway, AR (US); Chee-Fung Choy, Conway, AR (US); Samuel Kenton Welch, Conway, AR (US); Nysia Inet George, Little Rock, AR (US); Andrew Collin Shaddox, Little Rock, AR (US)

(73) Assignee: FIRST ORION CORP., Little Rock, AR (US)

( * ) Notice: Subject to any disclaimer, the term of this patent is extended or adjusted under 35 U.S.C. 154(b) by 34 days.

(21) Appl. No.: 16/378,880

(22) Filed: Apr. 9, 2019

Related U.S. Application Data

(60) Provisional application No. 62/715,658, filed on Aug. 7, 2018.

(51) Int. Cl.
H04L 29/06 (2006.01)
H04L 65/1076 (2022.01)
H04L 65/10 (2022.01)

(52) U.S. Cl.
CPC ...... H04L 65/1079 (2013.01); H04L 65/1006 (2013.01)

(58) Field of Classification Search
CPC .................. H04L 65/1079; H04L 65/1006
See application file for complete search history.

(56) References Cited

U.S. PATENT DOCUMENTS

| 5,463,681 | A | * | 10/1995 | Vaios | ...................... H04M 3/38 379/145 |
|---|---|---|---|---|---|
| 6,163,604 | A | | 12/2000 | Baulier et al. | |
| 9,264,418 | B1 | | 2/2016 | Crosley | |
| 9,774,726 | B1 | | 9/2017 | Jenkins et al. | |
| 9,986,098 | B1 | | 5/2018 | Gattu et al. | |
| 10,044,855 | B2 | * | 8/2018 | Tatourian | ................ H04W 4/12 |
| 10,057,428 | B1 | | 8/2018 | Petit-Huguenin et al. | |
| 10,320,841 | B1 | | 6/2019 | Allen | |
| 10,805,459 | B1 | | 10/2020 | Botner et al. | |
| 10,979,562 | B2 | | 4/2021 | Nagai et al. | |
| 11,176,461 | B1 | | 11/2021 | Merritt | |
| 2002/0188712 | A1 | * | 12/2002 | Caslin | ................. H04L 12/1446 709/223 |

(Continued)

Primary Examiner — Mohammad S Anwar

(57) ABSTRACT

One example method of operation may include identifying a call from a caller and destined for a callee, receiving a data message associated with the call, forwarding the data message to a call processing server, processing the data message to identify one or more call parameters, comparing the one or more call parameters to an active call scam model applied by the call processing server, determining a scam score for the call based on the comparing of the one or more call parameters to the active call scam model applied by the call processing server, and determining whether to notify the callee that the call is a scam based on the scam score.

20 Claims, 15 Drawing Sheets

(56) References Cited

U.S. PATENT DOCUMENTS

| | | | |
|---|---|---|---|
| 2005/0008083 A1 | 1/2005 | Miyoshi et al. | |
| 2005/0084083 A1 | 4/2005 | Lawyer et al. | |
| 2007/0076853 A1 | 4/2007 | Kurapati et al. | |
| 2008/0195387 A1 | 8/2008 | Zigel et al. | |
| 2008/0292077 A1 | 11/2008 | Vinokurov et al. | |
| 2011/0096673 A1 | 4/2011 | Stevenson et al. | |
| 2012/0226579 A1* | 9/2012 | Ha | G06Q 30/02 705/26.35 |
| 2014/0045456 A1* | 2/2014 | Ballai | H04W 12/1206 455/410 |
| 2014/0254778 A1 | 9/2014 | Zeppenfeld et al. | |
| 2015/0103990 A1* | 4/2015 | Lee | G06Q 30/0207 379/201.02 |
| 2015/0264180 A1 | 9/2015 | Wolthuis et al. | |
| 2015/0281445 A1 | 10/2015 | Kumar et al. | |
| 2016/0036973 A1 | 2/2016 | Harasimiuk et al. | |
| 2016/0071104 A1 | 3/2016 | Stamatis et al. | |
| 2016/0253919 A1 | 9/2016 | Coiner | |
| 2017/0053282 A1 | 2/2017 | Olumofin et al. | |
| 2018/0041641 A1 | 2/2018 | Shapira et al. | |
| 2018/0082690 A1 | 3/2018 | Warford et al. | |
| 2018/0083993 A1 | 3/2018 | Dragone et al. | |
| 2018/0262529 A1 | 9/2018 | Allen | |
| 2018/0324299 A1* | 11/2018 | Sial | H04W 4/16 |
| 2018/0343343 A1 | 11/2018 | Filart | |
| 2019/0014064 A1 | 1/2019 | Strauss et al. | |
| 2019/0037081 A1* | 1/2019 | Rao | H04M 7/0078 |
| 2019/0089750 A1 | 3/2019 | Hassan et al. | |
| 2019/0116495 A1 | 4/2019 | Stubblefield et al. | |
| 2019/0130490 A1 | 5/2019 | Durkee et al. | |
| 2019/0245967 A1 | 8/2019 | Walters et al. | |
| 2019/0333025 A1 | 10/2019 | Adamson et al. | |
| 2020/0019950 A1 | 1/2020 | Poole | |
| 2020/0067861 A1 | 2/2020 | Leddy et al. | |
| 2020/0067978 A1 | 2/2020 | Jakobsson | |
| 2020/0137232 A1 | 4/2020 | Krimstock et al. | |
| 2020/0143374 A1 | 5/2020 | Pitz et al. | |

\* cited by examiner

600

Phone A: 19562691665

Phone B: 19567017007

CALLER/
CALLEE
NUMBERS
612

Time (sec): 10/10/2018 22:25:25

Time (usec): 189903

IP ADDRESSES
614

Composite Score: 226

SIP INVITE:

INVITE sip:+19567017007;npdi;rn=+19566459982@208.54.48.26:5060;user=phone SIP/2.0

Via: SIP/2.0/UDP 216.221.155.24:5060;branch=z9hG4bK08B9a8172d231f23c20

From: <sip:+19562691665@216.221.155.24:5060;user=phone;pstn-params=808481808882>;tag=gK0834d9f6

To: <sip:+19567017007@208.54.48.26:5060;user=phone>

Call-ID: 503880913_75215926@216.221.155.24

CSeq: 649920 INVITE

FORWARDS
616

Max-Forwards: 49

Allow: INVITE,ACK,CANCEL,BYE,REGISTER,REFER,INFO,SUBSCRIBE,NOTIFY,PRACK,UPDATE,OPTIONS,MESSAGE,PUBLISH Accept: application/sdp, application/isup, application/dtmf, application/dtmf-relay, multipart/mixed Contact: <sip:+19562691665@216.221.155.24:5060>

P-Asserted-Identity: <sip:+19562691665@216.221.155.24:5060;user=phone>

Supported: timer,100rel

Session-Expires: 1800

MESSAGE
CONTENT
618

Min-SE: 90

Content-Length: 183

Content-Disposition: session; handling=required

Content-Type: application/sdp

CALL SCREENING SERVICE FOR COMMUNICATION DEVICES

CROSS-REFERENCE TO RELATED APPLICATIONS

This application relates to application No. 62/715,658, filed on Aug. 7, 2018, and entitled FINGERPRINT, the entire contents of which are hereby incorporated by reference.

Technical Field of the Application

This application relates to call management, and more specifically to a call screening service for communication devices.

BACKGROUND OF THE APPLICATION

Conventionally, mobile device users receive calls from undesired sources all the time, every day and sometimes every hour depending on the particular day. The source numbers which are used to dial the users may be local numbers, long-distance numbers, anonymous numbers, etc. The calls may be spam calls, scam calls, robocalls, etc. With recent updates to smartphones and the call screen user interfaces used during a call, the sources of the calls are generally displayed in some capacity to permit the user to identify whether to answer the phone call or not. However, there are generally limited tools available to demonstrate that the call is likely to be a scam or spam caller, especially in real-time so a caller can quickly decide whether to answer the call, drop the call, block the call, etc.

SUMMARY OF THE APPLICATION

Example embodiments of the present application provide at least a method that includes at least one of receiving one or more data messages, identifying a plurality of calls and corresponding call data from the one or more messages, identifying a plurality of call parameters from the call data, applying a call activity filter criteria to the call parameters to identify a suspect sub-set of the call parameters which indicate an elevated likelihood of call scam, forwarding the plurality of call parameters and the suspect sub-set of call parameters to one or more call data tables, and assigning one or more scam designation threshold scores to the suspect sub-set of the call parameters in the one or more call data tables.

Another example embodiment may include an apparatus that includes a receiver configured to receive one or more data messages, and a processor configured to identify a plurality of calls and corresponding call data from the one or more messages, identify a plurality of call parameters from the call data, apply a call activity filter criteria to the call parameters to identify a suspect sub-set of the call parameters which indicate an elevated likelihood of call scam, forward the plurality of call parameters and the suspect sub-set of call parameters to one or more call data tables, and assign one or more scam designation threshold scores to the suspect sub-set of the call parameters in the one or more call data tables.

Another example embodiment may include a non-transitory computer readable storage medium configured to store instructions that when executed cause a processor to perform receiving one or more data messages, identifying a plurality of calls and corresponding call data from the one or more messages, identifying a plurality of call parameters from the call data, applying a call activity filter criteria to the call parameters to identify a suspect sub-set of the call parameters which indicate an elevated likelihood of call scam, forwarding the plurality of call parameters and the suspect sub-set of call parameters to one or more call data tables, and assigning one or more scam designation threshold scores to the suspect sub-set of the call parameters in the one or more call data tables.

Still another example embodiment may include a method that includes at least one of identifying a call from a caller and destined for a callee, receiving a data message associated with the call, forwarding the data message to a call processing server, processing the data message to identify one or more call parameters, comparing the one or more call parameters to an active call scam model applied by the call processing server, determining a scam score for the call based on the comparing of the one or more call parameters to the active call scam model applied by the call processing server, and determining whether to notify the callee that the call is a scam based on the scam score.

Still yet another example embodiment may include an apparatus that includes a processor configured to identify a call from a caller and destined for a callee, a receiver configured to receive a data message associated with the call, a transmitter configured to forward the data message to a call processing server, and the processor is further configured to process the data message to identify one or more call parameters, compare the one or more call parameters to an active call scam model applied by the call processing server, determine a scam score for the call based on the comparing of the one or more call parameters to the active call scam model applied by the call processing server, and determine whether to notify the callee that the call is a scam based on the scam score.

Still yet another example embodiment may include a non-transitory computer readable storage medium configured to store instructions that when executed cause a processor to perform identifying a call from a caller and destined for a callee, receiving a data message associated with the call, forwarding the data message to a call processing server, processing the data message to identify one or more call parameters, comparing the one or more call parameters to an active call scam model applied by the call processing server, determining a scam score for the call based on the comparing of the one or more call parameters to the active call scam model applied by the call processing server, and determining whether to notify the callee that the call is a scam based on the scam score.

Still yet another example embodiment may include a method that includes collecting call metric data over a predefined period of time for a plurality of identified calls, querying the call metric data to identify whether one or more call filtering criteria parameters require changes, determining one or more call filtering criteria parameters require changes based on a deviation from one or more expected call metric data values included in the call metric data, modifying one or more of the call filtering criteria parameters, and updating an active call scam model stored on a call processing server based on the one or more call filtering parameters.

Still yet another example embodiment may include an apparatus that includes a memory configured to store collected call metric data over a predefined period of time for a plurality of identified calls, a processor configured to query the call metric data to identify whether one or more call filtering criteria parameters require changes, determine one or more call filtering criteria parameters require changes based on a deviation from one or more expected call metric data values included in the call metric data, modify one or more of the call filtering criteria parameters, and update an active call scam model stored on a call processing server based on the one or more call filtering parameters.

Still yet another example embodiment may include a non-transitory computer readable storage medium configured to store instructions that when executed cause a processor to perform collecting call metric data over a predefined period of time for a plurality of identified calls, querying the call metric data to identify whether one or more call filtering criteria parameters require changes, determining one or more call filtering criteria parameters require changes based on a deviation from one or more expected call metric data values included in the call metric data, modifying one or more of the call filtering criteria parameters, and updating an active call scam model stored on a call processing server based on the one or more call filtering parameters.

Still yet another example embodiment may include a method that includes identifying call data associated with a received call, identifying a plurality of call parameters from the call data, and the plurality of call parameters include one or more call routing parameters associated with call routing of the call and one or more call session parameters associated with a call session of the call, assigning weights to one or more of the call routing parameters and the call session parameters, determining a scam score for the call based on a sum of the weights applied to the call routing parameters and the call session parameters, and blocking the call when the scam score is greater than or equal to a predetermined threshold scam score.

Another example embodiment may include an apparatus that includes a processor configured to identify call data associated with a received call, identify a plurality of call parameters from the call data, and the plurality of call parameters include one or more call routing parameters associated with call routing of the call and one or more call session parameters associated with a call session of the call, assign weights to one or more of the call routing parameters and the call session parameters, determine a scam score for the call based on a sum of the weights applied to the call routing parameters and the call session parameters, and block the call when the scam score is greater than or equal to a predetermined threshold scam score.

Another example embodiment may include a non-transitory computer readable storage medium configured to store instructions that when executed cause a processor to perform identifying call data associated with a received call, identifying a plurality of call parameters from the call data, wherein the plurality of call parameters comprise one or more call routing parameters associated with call routing of the call and one or more call session parameters associated with a call session of the call, assigning weights to one or more of the call routing parameters and the call session parameters, determining a scam score for the call based on a sum of the weights applied to the call routing parameters and the call session parameters, and blocking the call when the scam score is greater than or equal to a predetermined threshold scam score.

BRIEF DESCRIPTION OF THE DRAWINGS

FIG. 6A illustrates a set of call message parameters in an active call request according to example embodiments.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide a call scoring, monitoring, auditing and/or processing platform configured to provide call screening of potential scam/spam callers. The term 'scam' and 'spam' are used interchangeably and are intended to identify various types of unwanted/unexpected calls, such as those calls which are attempting to defraud persons of money and/or sell products and services which are undesirable and unexpected. Those types of calls usually tend to be performed by certain origination call number sources and call number prefixes which can be readily identified and which are used to perform large-volume calling of targeted user devices. The calling sources may use dynamic call routing features which change numbers, locations, etc., however, certain characteristics may be identified to limit the scam caller entities' success in communicating with intended call recipients.

Figure 1:
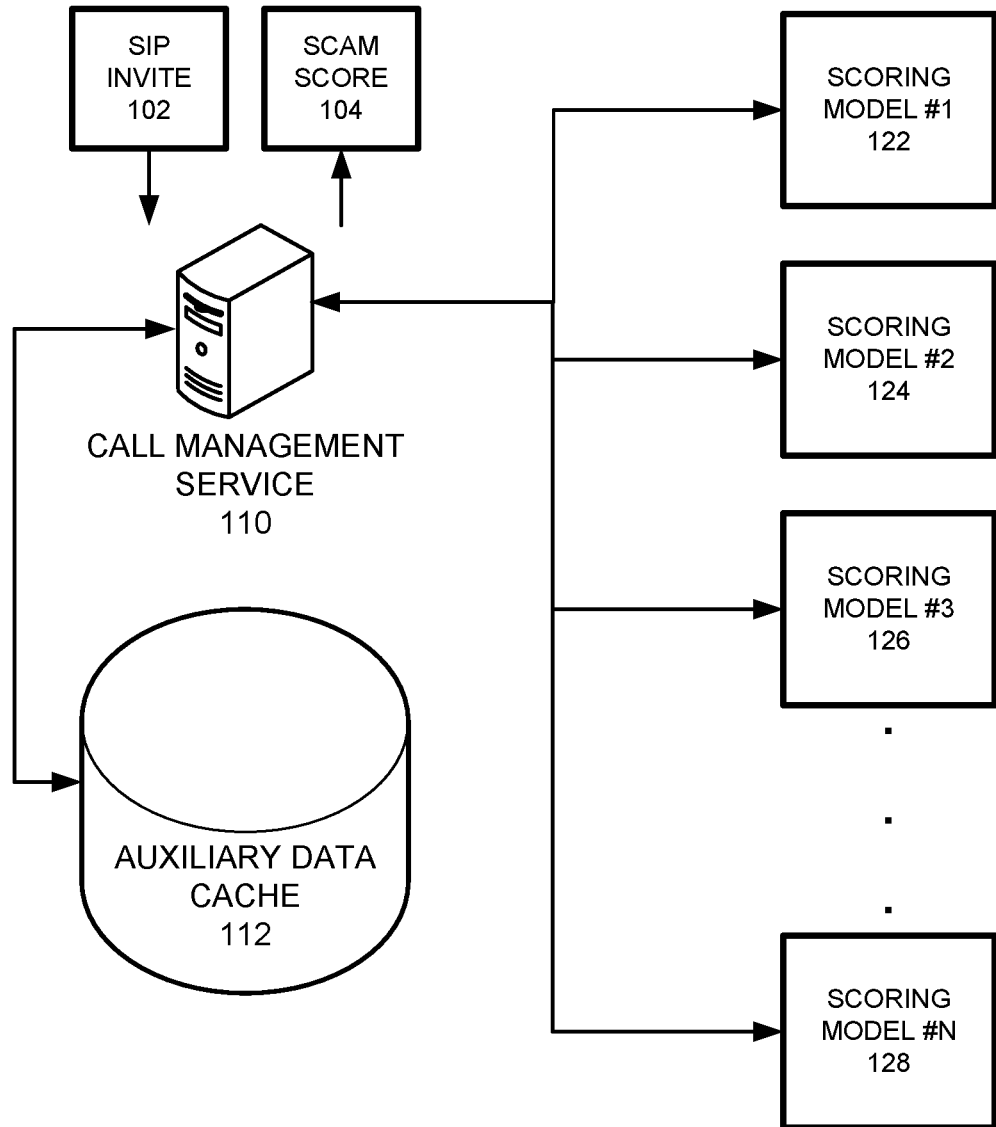
FIG. 1 illustrates an example call management network configuration according to example embodiments.

FIG. 1 illustrates a call management configuration for monitoring and screening calls based on a call model, according to example embodiments. Once a call model is created and distributed to certain servers, at the start of any particular call to a client end user device, the call processing platform service server 110 may receive a SIP INVITE packet 102, which is provided to the call management service to produce a scam score 104. The service 110 sends the INVITE packet, plus additional data to the active model or models 122-128 for scoring purposes. Each of the models may be located at a different server or site and may be used to provide a composite score, such as an average score from all the scores obtained. The additional information includes data, such as the number of calls the calling number has made in a recent time interval, such as the last six minutes and/or a one minute time interval. Each model receives the INVITE and additional data, then "scores" the incoming call and returns the numerical score along with a scam/spam flag (yes/no) depending on the score value. The call service 110 may compute a composite score from the model score(s) and return the final score and a corresponding scam flag back to the requesting entity. The auxiliary data 112 may include model specific tables, call data, scoring criteria, etc.

With the call management system, the call management service, as well as each of the model(s) is a separate independent process. Process separation provides fault isolation, as well as simple upgrades to newer versions. Additionally, new models can be dynamically added or removed without stopping and starting the call management service. The fingerprint service scoring model for caller-to-callee (landline to mobile, mobile to mobile, mobile to landline, landline to voip, voip to mobile, voip to landline, voip to voip, mobile to voip, etc.) calls is based on the notion of quantifying and scoring suspicious activity. Suspicious activity is a binary feature, which assumes a value of suspicious or non-suspicious depending on a relative scoring model. The value is derived from multiple binary outcomes that are generated from statistics of historical call data. The modeling scheme used by the call management server and corresponding scoring model servers, builds several scoring tables and where each table summarizes the percent of suspicious activity relative to the total number of incoming calls. Table keys depend on a summary of interest, such as the NPANXX of the calling number or the from IP field of the session initial protocol (SIP) header of the call.

Each scoring table can be built using a predetermined amount of time of incoming call data, such as, for example, six minutes. This data is used as a training model, which is then applied to the subsequent 6 minutes of incoming call data for testing. A proprietary scoring algorithm is used to assign a 'scam score' based on the degree of suspicious activity in the training data. Also, neighborhood calls and non-neighborhood calls are scored independently using weighted models to combine table scores and real-time data. "Scam likely" calls are identified using methods similar to multivariate adaptive regression splines to determine when a score deviates from normal.

Decisions are guided using machine learning methods, such as K-means clustering. K-means clustering is a machine learning technique used during the model trainer process to identify likely spoofing behavior. It is a supervised learning technique which is used to identify 'spoof' like behavior in multiple changing sub-parameters, such as 'NPA', 'NPANXX', 'NeighborhoodScores', etc.

The call management application and service permits for real-time analysis of phone call data as the calls arrive, for example, SIP INVITE messages which are received by a call server may forward the SIP INVITE information to the call processing server for scam analysis prior to ringing the end user's device as an active call so that a scam/spam analysis and determination can be made before connecting the call. Utilizing a 'hot-swappable' data model(s), the call management service is able to adapt to constantly changing scammer tactics. This approach provides the call management service with the ability to analyze phone call data intelligently and accurately without just relying on phone numbers alone. The call management service used a "fingerprint" of the call to identify phone numbers that may have been "spoofed". The processing occurs in milliseconds as phone calls are initiated to provide a level of protection to the consumer that impacts neither the consumers' devices nor their legitimate phone calls.

In some examples of scam calling, a scammer may use an automated calling platform to places calls using a single phone number in a repetitive manner. This approach is identified by the call management applications and that particular scammer's number is then blocked by adding the identified number to a black list file of numbers which are not permitted as call destinations to protected users implementing the call management application. As a scammer receives a blocked status, they may recognize the failed number status and then begin rotating other telephone numbers as other origin call origination points from a pool of numbers they currently own and operate. Other approaches taken by call scammers is 'spoofing' numbers, which is when they use a number or numbers from known businesses, pretending to be a real call but instead delivering different call purpose information. The call recipient may recognize the number or trust the number and answer the phone only to discover a spoofed call. More recently, call scammers are now spoofing numbers that have a same area code and prefix, such as the first 3, 4, 5, 6 or even more numbers as the call recipient so the call recipient is more likely to familiarize with the telephone number calling and thus answer the call. Some other known call scam tactics include calling and hanging-up immediately, or making two concurrent calls, one to hold the line busy while the second one reaches the callee's voice mail. Both methods are attempts to reach the callee and have them return the call at a later time. As each call scam method is identified, scammers evolve their methods to reach more call candidate victims. As a result, the call scam number identification procedure must recursively track the current scammers and apply call scam detection in an ongoing process sometimes several times within a single hour.

As the scammers started 'spoofing' numbers, the calling number which is displayed to the call recipient may actually be from a legit entity or business and may not deserve to be blocked. Blocking the number could affect the legitimate business since their calls cannot then reach certain intended callees. As a result, the calling number identified is generally not a reliable source of information. The call management application according to example embodiments does not rely on a calling number as call monitoring and/or blocking criteria, but instead various other call origination data that is created from a calling party's call setup information (i.e., call attempts) which are identified as being destined for a destination carrier network. Depending on the actual origination location of the call, the call setup data can change as the call request progresses. By identifying the call route data, the application can identify a pattern of actual legitimate calls originating from a particular business vs. a spoofed call pretending to be from a particular business. The application is used to examine the data for each call session to decide whether the call should be permitted to pass to the end user recipient or be screened according to call screening criteria.

In another example embodiment, there may be multiple installations of different scoring models. Each scoring model is setup to look for one or more specific scam scenarios and return a score back to the application. Since there can be multiple active scoring models, the application may accept a number of computed scores to calculate one final score based on an average of the computed scores. As each call is received, the call session information may be forwarded to the application. The call can then be distributed to all the installed scoring models. A score is returned from each model to the application. The application calculates the final score (e.g., average, maximum score, total score, etc.), and the final score is returned back to manage the call. The call is then routed appropriately based on the score and one or more user preference (e.g., complete the call, drop the call, send to voicemail, etc.).

Figure 2:
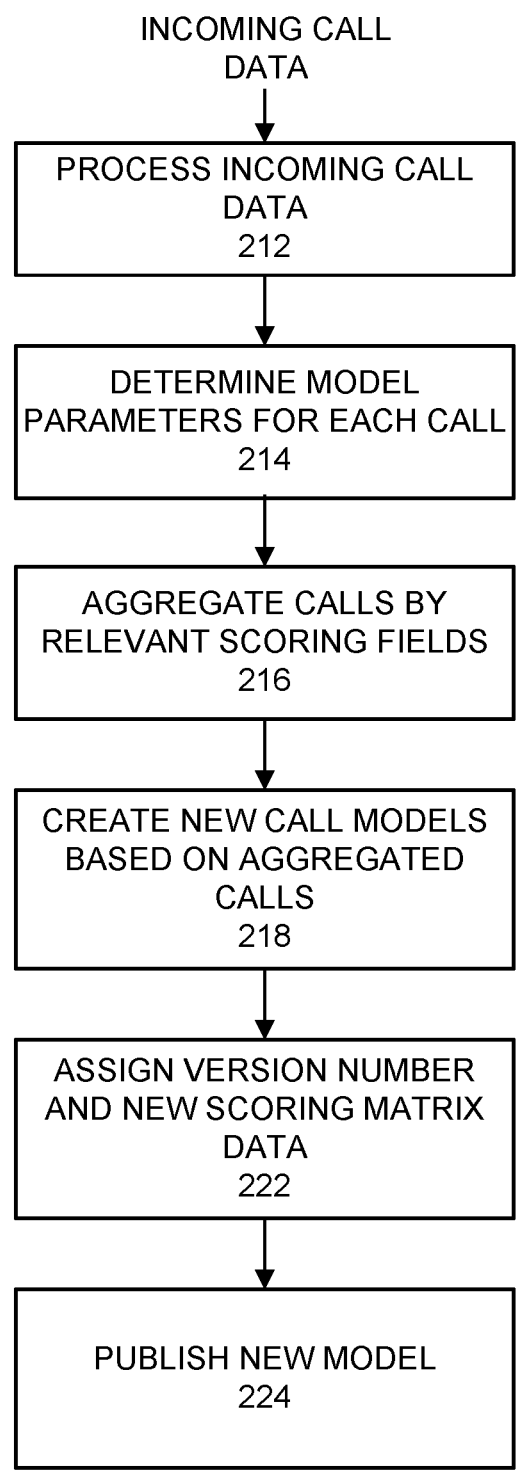
FIG. 2 illustrates a flow diagram of an example method of processing call data according to example embodiments.

FIG. 2 illustrates one example embodiment of a logic call flow diagram for creating a call management training platform. The trainer applications used to enforce call management, for end users via a provider call management system, require setup, updates and dynamic configurations. For instance, the call processing models used by the call management servers must be created/updated in short periods of time to provide updated call pattern information. Such call patterns may be recently emerging and/or new types of scam/spam calling that can be identified and shared as updates to the call models stored on corresponding distributed servers. Scoring algorithms applied to identified calls may be performed by pre-scoring calls and then used as the basis for actual scoring applied to recently updated call models. Once a model is created or updated, the model may be distributed and used for all ongoing call screening efforts.

In operation, the diagram 200 includes incoming call data being identified and processed 212 to determine model parameters 214 to include for each call as part of the call model. The calls may be aggregated by relevant scoring fields 216 and the model can then be created 218, assigned a version number 222 and new scoring matrix data since the last model and then published 224 to all relevant servers which aid in the use of the call data for updated scam management procedures.

Figure 3:
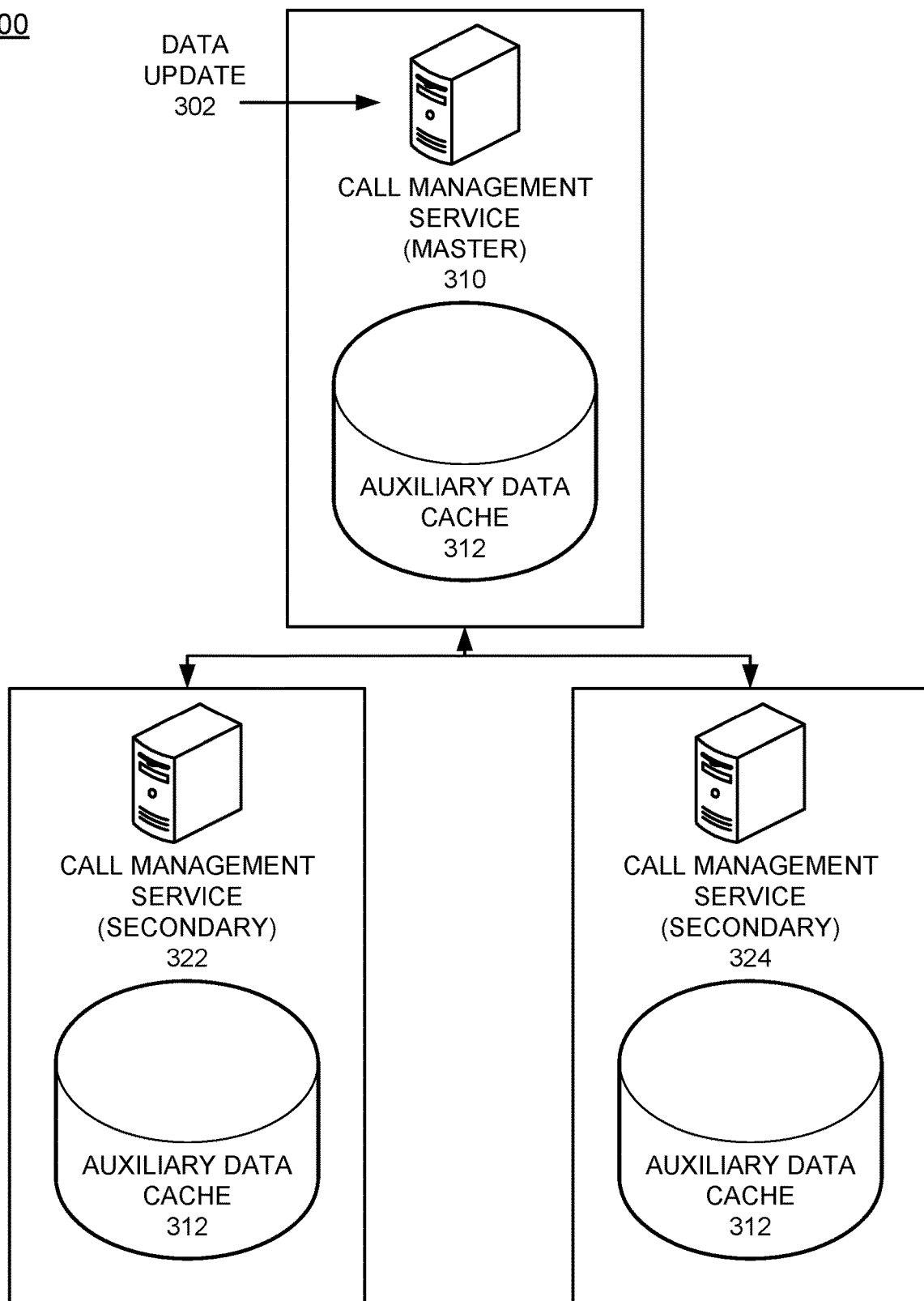
FIG. 3 illustrates a multi-server call management configuration according to example embodiments.

FIG. 3 illustrates a high-level system configuration of the call management service hierarchy according to example embodiments. Referring to FIG. 3, the configuration 300 includes a data replication service where call data, updated models and other data 302 are received at a master call management service server 310 and stored in an auxiliary data cache 312. The call management master 310 may be an elected master that is responsible for delegating the model updates to the other servers in the call management infrastructure via an automated replication service that propagates the data to the other entities in the network.

The data management of the call management servers 310, 322 and 324, each of which are deployed at a different data center site location, is performed by a centrally managed server which may be the same or separate from the call management service master 310. When updates are made to the master data sets and corresponding models, such call model data is then persisted as updates to each of the service servers, each of which references its own auxiliary data cache 312 where the updates are stored to perform call processing and screening.

Once the auxiliary data cache 312 for one of the servers 310 is updated, that data is then synchronized with the other call processing servers located in different sites. All of the servers 310, 322 and 324 then synchronize with each other to ensure that all instances have the most updated data. The different call server services 310, 322 and/or 324 may be used to provide redundancy in case one or more fails. As each call enters a network, the calls are routed to the different servers to provide load balancing and other optimal call routing features when attempting to connect a call. All call servers identified in FIG. would ideally have the call screening data, updated, and available to limit call pass-through to call recipients according to the call screening management criteria.

The "hot-swappable" nature of the servers is made possible by the deployment process where all models will be deployed using a package manager application, which permits for certain operations to occur without taking down or restarting the servers. For example, new models can be added dynamically, old models can be retired dynamically, which is performed using an erase/uninstall feature of the package manager. Also, model versions can be updated and all updates may reach all of the servers in all of the different data centers.

The call management service permits for real-time analysis of phone call data, such as SIP INVITE messages received, as the calls are taking place. Also utilizing 'hot-swappable' (i.e., active replaceable) data models, the servers can receive updates to identified scam/spam caller tactics as they evolve on a minute by minute, hourly, and/or daily basis. The call server may analyze phone call data more intelligently and accurately than relying on source phone numbers alone.

Upon receipt of the scam score, the call processing server may "tag" the phone call with one or more of the following identifiers (i.e., flags) based on decisions made by the call processing logic. Some call determinations may include to block the call, send the call to voicemail, tag the call as 'spam' per customer requirements, such as, for example, "Scam Likely", which is presented on the user's interface screen during the call ringing operation. This list is not all-inclusive as those skilled in the art will recognize other call management operations which may be applied to calls which are identified as unwanted and/or undesirable.

The call management service computes scam scores based on call signaling data, such as the data contained with the SIP INVITE of the call itself. Also, historical phone number keyed data may also be referenced. For example, a database of phone numbers that have been reported by consumers as "scam" or "nuisance" are referenced during the call receiving and processing operation. Call volumes and metrics, such as phone call durations are also identified as history information that can be referenced for call designation purposes since a long history of short calls can be readily identified as spam callers from a particular source.

The data provided by the call record service is necessary to compute a call spam/scam 'scam' score. In computing the scam scores, the call management server sends the SIP INVITEs to all the call models stored on various call processing servers. Each model may be unique and may make use of some, all, or none of the following auxiliary data sources: call history data, a local exchange routing guide (LERG), location number portability (LNP), lookup tables (specific to particular models), etc. Also, multiple independent models can be used simultaneously to compute scam scores. The call processing servers will return a calculated composite score based on all applied models as well as the individual scores computed by each model.

In operation, the call processing server interacts with call management interface modules to receive SIP INVITES that are received directly from the call processing modules. The SIP INVITEs are then forwarded to the models for scam score calculation(s). Upon receipt of the scam scores, the call management server calculates a final scam score and sends this score back to call processing modules, which then passes this score along to internal modules that will use the information for further processing of the call.

Transmission protocols, such as user datagram protocol (UDP) and transmission control protocol (TCP) are both supported by the call management server so the call processing modules can send the SIP INVITEs over either protocol for processing. The auxiliary data cache is a collective term for any data utilized by the models other than SIP INVITES. Each of the different datasets may be updated with different frequencies. For example, LERG may be updated monthly while some lookup tables may be updated daily. Also, SIP INVITES may be instead other types of call signaling used to setup a digital voice call between a call originator and a call recipient. The call invites may be identified as being sent from the origination device and/or other network components along the call request route. For example, a last relaying point (i.e., device) in a communications network, may be considered a call request origination or part of the call path origination.

The scoring model for scam call assignments and filtering for mobile-to-mobile or any type of device/protocol calls is based on the notion of quantifying and scoring suspicious activity. Suspicious activity is a binary feature, which assumes a value of '1' (suspicious) or '0' (non-suspicious). The variable is derived from multiple binary outcomes that are generated from descriptive statistics of historical data, derived scores, and features obtained from the session initiation protocol (SIP) header. This approach may include a decision tree model based on features, such as a 'scamScore', 'scamFlag', 'PSTN parameter', 'autoDialFlag', and 'possibleSpoofFlag'. For example, a call is deemed suspicious if the scamScore>69 or the scamFlag=1.

The score modeling scheme may, for example, construct different scoring examples, each table summarizes the percent of suspicious activity relative to a total number of incoming calls. Those skilled in the art will recognize that any number of tables used to identify suspicious/scam calls may be used depending on the goals of the call monitoring effort. Aggregate functions are used to compute a total number of calls (all calls) and a total number of suspicious calls, which include those which may be identified according to a certain type of filter criteria. Then, a separate scoring function is used to score a level of suspicious activity based on the total number of calls. A brief description of the scoring examples used as call management criteria is discussed below, and a separate scoring function is used to score the level of suspicious activity based on the total number of calls. The numbering convention used is based on a North American phone numbering convention, such as the NPA-NXX-XXXX scheme, wherein the value 'N' is any digit from 2-9, and 'X' is any digit from 0-9. The first three digits 'NPA' identifies the 3-digit numbering plan area (area code) and NXX identifies the central office. The last four digits are customized digits for a particular customer account.

According to example embodiments, one approach 1) may be to identify calls destined to NPANXX, which summarizes suspicious call activity going into an NPANXX. Another approach 2) may be to identify calls destined to NPANXX+SIP, which summarizes suspicious call activity at a NPANXX and a specific SIP signature. Yet another approach 3) may be to identify calls destined to NPA+PSTN, which summarizes possible spoof activity going into an NPA and a specific PSTN parameter. Other approaches for call tracking criteria may include 4) a call from a certain NPANXX+PSTN, which summarizes possible call spoof activity coming from an NPANXX and a specific PSTN parameter. Yet another approach may include 5) a call from NPA+IP, which summarizes suspicious call activity coming from an NPA and a specific IP address. Still another example may include 6) a call from NPA+SIP, which summarizes suspicious call activity coming from an NPA and a specific SIP signature. Still another approach may include 7) a call to a NPA-3/4/5/6, etc., which summarizes suspicious call activity coming into NPAs where the number of matching digits between the 'from' and 'to' phone numbers equals 3/4/5/6, etc. For example, a called number from a calling number may share an area code of 555 as three digits and any more shared digits between caller and callee would increase the number from three to however many digits are the same between the numbers assigned to the calling and called parties. Still yet a further example may include 8) calls to a NPANXX autodial, which summarizes autodialer call activity coming into a specific NPANXX. Another approach may include 9) calls based on summarized neighborhood activity (i.e., numMatchDigits>3) for each phone number identified.

When creating a scoring table and scoring table criteria, the table may be built using incoming call data from a 6-minute window. This data is used as a training model to establish scam scores and filtering data to apply to subsequent call management operations. The scores computed during training are applied to a subsequent fixed time (e.g., 6-minute) interval of incoming call data for scoring purposes. For example, neighborhood calls (numMatchDigits>3) and non-neighborhood calls are scored independently using weighted models to combine table scores and real-time data. "Scam likely" calls are identified using methods such as multivariate adaptive regression splines to determine when a score deviates from normal. Decisions for designating calls, callers, etc., as scammers may also be performed using unsupervised machine learning methods, such as K-means clustering.

According to example embodiments, the different tables constructed may be used to represent a representation of scam/suspicious activity for a given time frame. As time progresses, older models grow less relevant. Tables are dynamically created to represent the current behavior of in-network calls, not static rules about how calls with certain attributes are always more or less disposed to scam or suspicious activity. Since the behavior of in-network scam calls are constantly in a state of change, the table models must also be dynamic. After training phases are completed, the trained call management models are then published to a call management system, which resides inside of a telephone carrier's distributed data center, which is the network infrastructure which routes and connects calls between end users (e.g., businesses and consumers).

There are two primary forms of model/table data, including streaming and transactional data. Each type of data update may be granted a time-to-live (TTL), which determines how long the record may exist. Transactional models are trained/created over an arbitrary period of time based on some previous time period's activity and then sent to the carrier call handling system. All prior instances of the transactional data are removed all at once, and the new data is loaded and used all at once. This data must be treated as a unit. While the system receives the new transactional tables and loads them, the old transactional model can be used. The new transactional models are not used until they are fully loaded to the phone carrier's call processing systems. At this point, those new models will be used in place of the former version. Streaming data models are also trained and created over an arbitrary period of time, and are based on some previous time period's activity as well. The difference with streaming data is that it may be streamed to the carrier network, one change at a time, with the specific updated data element beings overwritten, while other fields remain the same. Streaming data typically represents a caller/called party's profile information pertaining to a particular network.

An example of a transactional model would be a neighborhood level score, for a specific list of a NPANXX, that would need to be updated completely, for each defined time period. For example, P0 (time period P'N')=501555->NeighborhoodScore=10, 501554->NeighborhoodScore=20, 501553->NeighborhoodScore=10, and P1=501555->NeighborhoodScore=0, 501554->NeighborhoodScore=100. The update may be performed as an atomic, full-refresh type of transaction, meaning that during P1, a caller or call receiver which has the NPANXX=501555 should always return NeighborhoodScore=0, and 501553 should not return anything, since it was not included in that period's update.

In an example of a streaming data model, a particular key's values can update independently, and do not need to be treated as a unit of data which must be replaced each data update iteration. For example: for a period of time P0=501555->NumberOfCalls=2(TTL=4), P1=501554->NumberOfCalls=10, 501553->NumberOfCalls=1, P2=501555->NumberOfCalls=3(TTL=4). In this streaming update scenario, 501555 should still exist in P1 with a value of 2 since it was given a TTL of 4 periods. When a P2 update arrives, the count should now be 3, and the TTL should be an additional 4 periods after P2. Neighborhood calls are treated differently than non-neighborhood calls in that there are specific scores that are based only with non-neighborhood calls and other scores which are based on some neighborhood calls. The scores are differentiated because they represent different kinds of calls. A call being designated as 'neighborhood' or 'non-neighborhood' affects both the scoring model and the calculation of a score in real time.

When in a training stage, the call management application may rely on multiple data points/parameters, which are used to pre-score the call data. The data points include but are not limited to: a call number NPANXX#### (full phone number), call number parameters NPANXX (to/from), call number parameters NPANX (to/from), call number parameters NPAN (to/from), call number parameters NPA (to/from), IP address information (to/from), network information of the network generating the call, network information of the destination, network information of any networks the call has traversed, PSTN specific parameters, altered and unaltered SIP data, call activity within multiple time periods, local routing numbers (LRNs), P-asserted identify, request URI, supported, Max forwards, SDP, content length, etc.

The function of all pre-score values, as input parameters to an overall scoring function results in the score to be used when screening calls. The overall scoring function depends on the type of scoring being performed on a network call event. In one example, a basic scoring model may contain four to five fields: 1) score name, which is a name of the score represented, such as to/from NPAScore, NeighborhoodScore, etc. 2) primary key, which is a first key matched to get a score, which could be any value, but which value is matched and which is based on the score name (to/from NPA, NPANXX, full phone number, pstn_parameters, etc.), 3) secondary key, which is the second key matched to obtain a score, unlike the primary key, this secondary key is optional, 4) subscore/prescore, which is used to meet a score criteria and match the primary and secondary keys, and an overall score, which is a function of all subscores, the output of which is the score used in call handling/routing and decision making regarding call management decisions.

Audit criteria may be certain research data that is determined from a real-time data stream, and which is sent back to the call model trainer. This information is used by downstream models for further training purposes, as well as for audit personnel and automated audit tools which perform audit checks and reporting on the current condition and integrity of the call management system. This information may include the phone number, the score, the model used to generate such a score, and all parameters used as part of the current scoring function.

Certain demographics may be used to identify a neighborhood of a caller/receiver, similarity between the calling and called parties, etc., so that during a call training session, calls are viewed as a whole from a carrier network, trends are located, and certain numbers are placed on a suspected scammer source list. The trainer feature may operate independent of the numbers being scored for scam purposes. The trainer function trains models/tables in the cloud network environment based on some prior period of time for identifying call activity. Call data is streamed to the cloud network, which is then used for training purposes. After training, the trained information is published back to the carrier network. The carrier network is responsible for using multiple scores provided by the trainer, to then perform a function to create an overall score. The overall score is then used by the call treatment software to accept or reject an individual phone call. Because a carrier network is typically distributed across the United States, overall scores using the same training data may vary, since some of the trained data may depend on the location (i.e., demographic) of the carrier network which receives the call. For example, a carrier network server_A may be located in San Francisco, Calif., and a carrier network server_B may be located in New York City, N.Y. If an identified call is routed through server_A, and a score representing neighborhood activity in a suburb of NY may compute a score of 1, as only few NY calls have been routed through San Francisco. Depending on the model, the score of 1 may indicate that this is highly suspicious activity, or may indicate that it's not suspicious. The call model is able to use context, such as location, via sub-scores/pre-scores, to determine accurate scoring which can be applied to call control features.

One example process of managing scores may include calculating subscores for each caller such as a scam score, and other flags. For each call, calculate a 'suspiciousFlag' for that call, create a series of counts for a number of different metrics (e.g., a certain section (neighborhood) associated with the A or B device number). The total count of calls and the number of calls that are in some way considered 'suspect' are identified, then the percentage of suspect calls among all calls for the metric are calculated, and the number of total calls, suspect calls, and percentage to calculate a score for the given metric are used. The call model, once completed, may be considered 'trained' and is then published to the call management system. The trainer function reads from a stream of call data that supplies a number of fields dealing with a call event, relating to the 'A' (i.e., caller) and 'B' (i.e., called) numbers, as well as other fields that indicate how the call was connected in the network, including the time the call was placed. During training, call activity on a phone carrier's network is analyzed to build a series of models and activity profiles which represent 'normal' behavior. Outliers are then identified and adjustments are made to the activity profiles to build the final models.

In general, the auditing service is performed for improvement of a particular training model. For example, data input can be used for retraining of downstream data models, identifying why a call was treated a certain way, helping legitimate autodialers/robodialers, such as emergency notifications, political calls, debt collectors, etc., reach their intended audiences, and other similar use cases.

Figure 4:
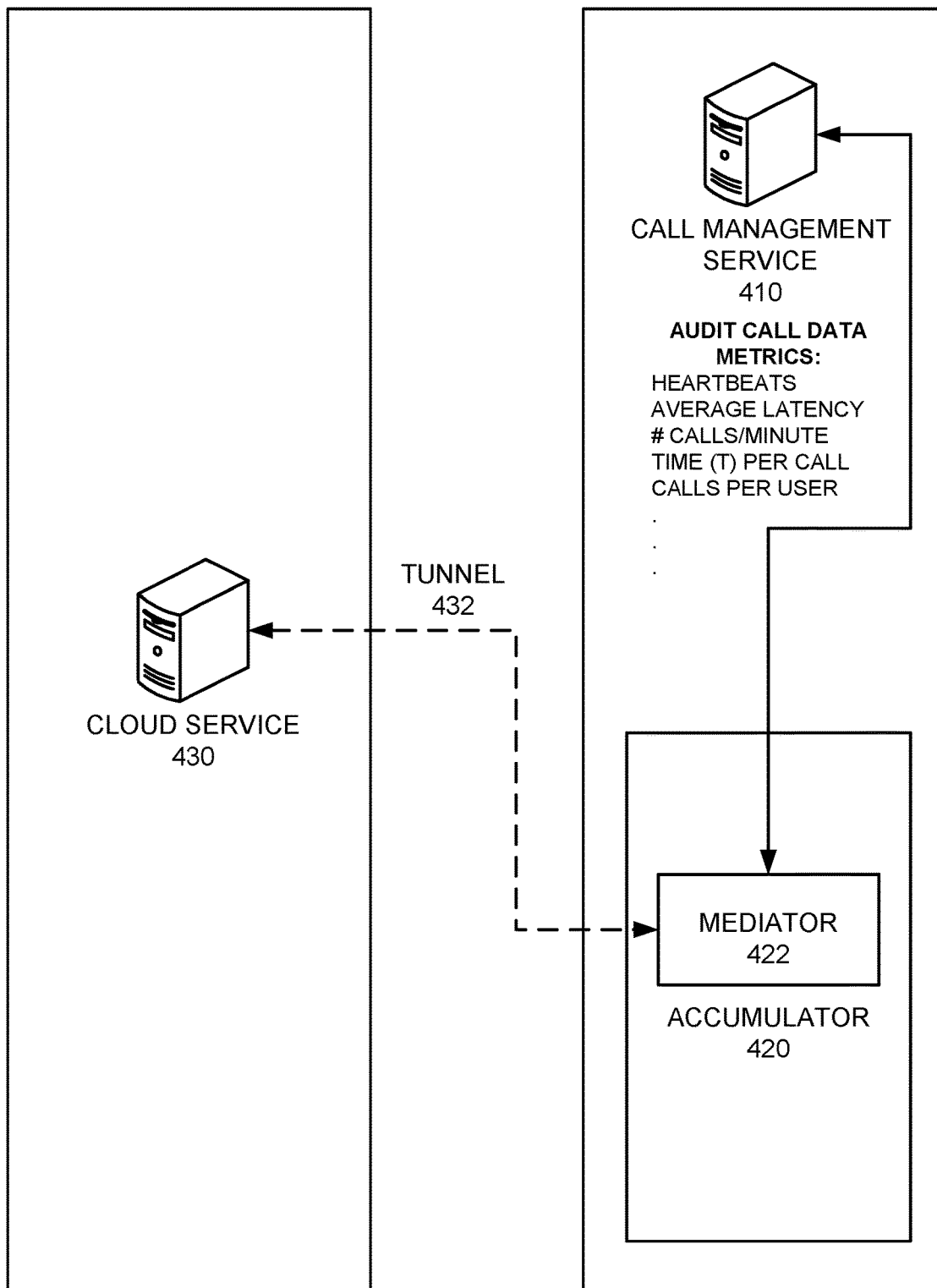
FIG. 4 illustrates a call audit and monitoring system configuration according to example embodiments.

FIG. 4 illustrates an example call monitoring procedure according to example embodiments. Referring to FIG. 4, the configuration 400 provides a cloud service 430 being configured to monitor the call management server's operations and metrics. The call management server 410 will have its execution and performance monitored by a cloud management entity. For example, certain metrics will be monitored and reported periodically. The metrics which are monitored and the frequency of the metrics being monitored may include a heartbeat signal for the call management server being monitored at once-per-second with a check-in operation ensure it is still operation, an average latency, which is the average time calculated over one minute that it takes for the call management server to receive a request, forward it to the call management server models, receive all model scores, and return a response to the call processing platform. Another metric to monitor is the number of calls per minute, which is scored by the call management server over a one-minute interval. Additional metrics may need to be included to ensure adequate monitoring of the system and models used to manage calls.

The monitoring operations will be facilitated by the use of a transport layer security (TLS) 1.2 tunnel 432 to permit a connection between the servers, so the call management server 410 can operate an accumulator function 420, which will forward the metrics, via the mediator function 422, to the cloud management server(s) for constant monitoring. Since the call management server 410 is separate from the call processing platform, if the call management server does not provide a scam score to the call platform in a reasonable time, for a particular call, then the call will still be processed without a scam score and without any errors.

If one of the call processing models and the corresponding servers fails (i.e., crashes), the call processing server will calculate a final scam score using the scores obtained from the other models which are still operational. If a model has failed (crashed), the call processing server is notified and will restart the crashed model. The model will not generate scores until it has been restarted successfully. The call processing server will keep a "heartbeat" operating on all active models. If a model becomes unresponsive 'hung', the call processing server will terminate the model and restart the model in an attempt to correct the failure. In order to provide real-time call processing results, the call processing server maintains a timer for each INVITE that is sent to each model for scoring purposes. If the timeout is reached before a score is returned the call processing server will continue score calculation without that slow model's score.

All data elements used in computing a scam score for a particular call will be retained on-site (upon the server it originated) for 90 days. This data is being collected for auditing (investigating why a particular call was blocked, tagged, etc.). Queries on this data will be controlled by the accumulator. Only the specific data entries that are used for a particular call are included in the data that is saved for auditing. The SIP INVITE contains all of the information about the call. The call processing server and its corresponding models use the SIP INVITE in determining each calls' scam score.

In a call processing example, the calls are identified with certain information, such as a timestamp, which is the time at which the call was initiated, a 'Phone A' parameter, which is the phone number that initiated the call, a 'Phone B' parameter, which is the phone number receiving the call, LERG data, which is the data that is used by some models to calculate the scam score, call history data, which is the data provided by the call history database that some models may use to calculate the scam score, model input data, which is the data that may be used by one or more models, model 1, 2, 3 . . . N scores, which are each of the models' individual scores. Other information may include composite scores, which are the final scam scores calculated using the individual models' scores.

Access to the audit data will be provided through a web interface which will be available to the service provider and clients of this call management service, provided those entities have the proper permissions and credentials. Access to this web interface (UI) will be controlled by requiring that users of the service are both connected to the client's virtual private network (VPN), and have been assigned the appropriate application permissions in their respective domains. An auditing service will connect to the audit service via a web browser and will be able to view the audit data in a searchable, filterable, tabular format. The search window may be limited to a 24-hour period to prevent unnecessary strain on the underlying audit service search system. All queries and their responses are encrypted with elliptic-curve encryption or any type of suitable encryption. The call management auditing service will also make a connection to the call management platform. Each edge server/call processing server has its own auditing service that will search within that edge server's audit data. The results across all edge servers are compiled when a search is executed by the audit service. An audit service will be operating on each accumulator and each audit UI service will be able to query all the auditing services operating on all the edge servers. All queries executed on the auditing UI service will be logged including the username/email address, etc., as it is defined within the domain of the service executing the queries. The queries will be logged on the audit services. A summary of the audit data that will be propagated from the call processing server to the call history information. The data elements listed are per each call that is scored. Some of the call elements are inputs to the call processing server and its applied call scam models.

Figure 5A:
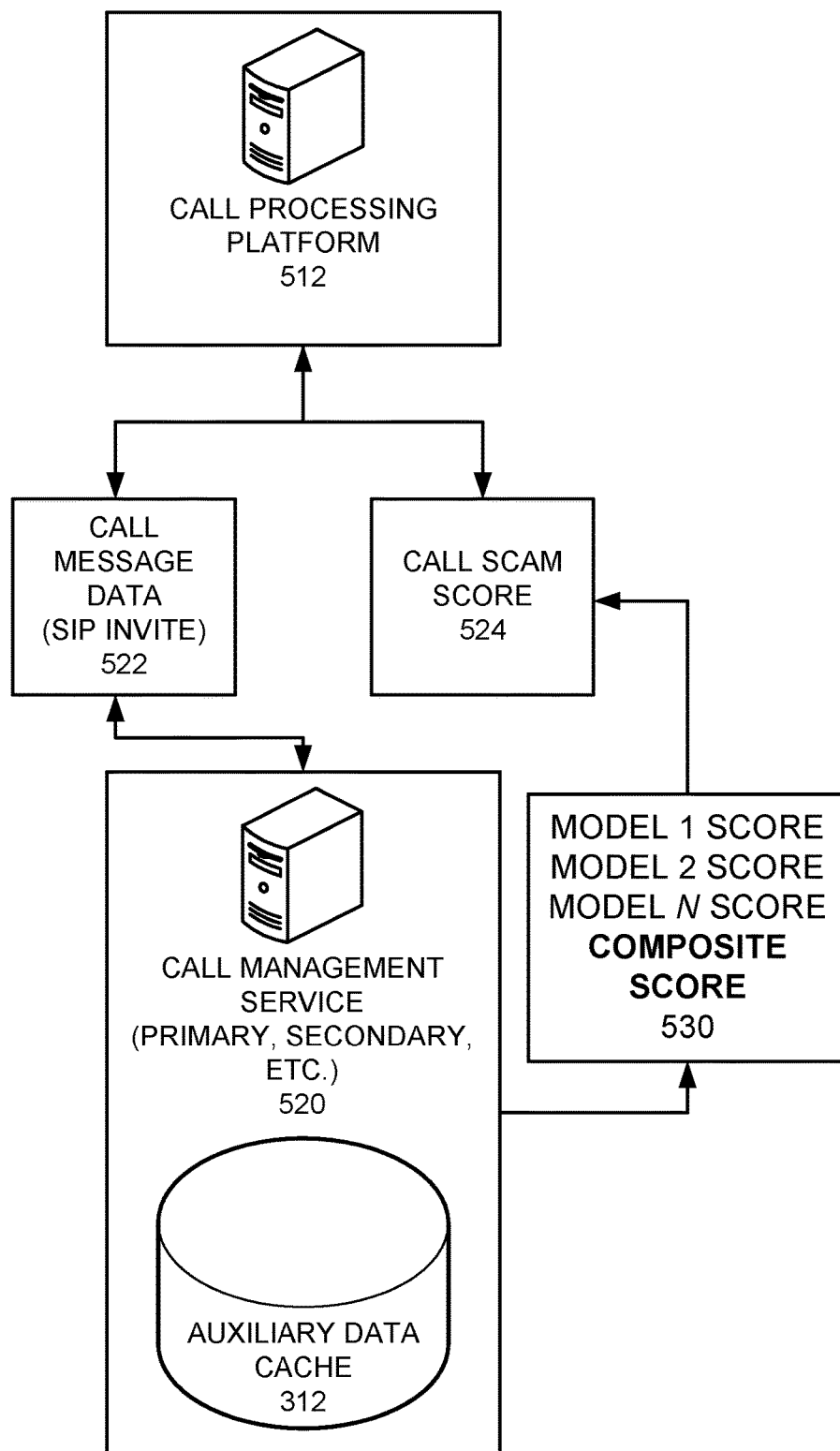
FIG. 5A illustrates a call parameter processing diagram for performing composite score analysis according to example embodiments.

FIG. 5A illustrates a call parameter processing diagram for performing composite score analysis according to example embodiments. Referring to FIG. 5A, the configuration 500 provides a call processing platform 512 as a core carrier unit that receives call messages from new calls and which may forward the call message data 522 to a call management server 520, which stores the call data in a local or remote database 312 for easy reference purposes. As the call data is received in real-time, the active score model from each server may be received and compared with the other scores from other servers to create an average score or composite score 530 used to enable a scam score 52. The highest/lowest score may be thrown out to adjust a score curve before making a scam call decision based on the median scores calculated.

Figure 5B:
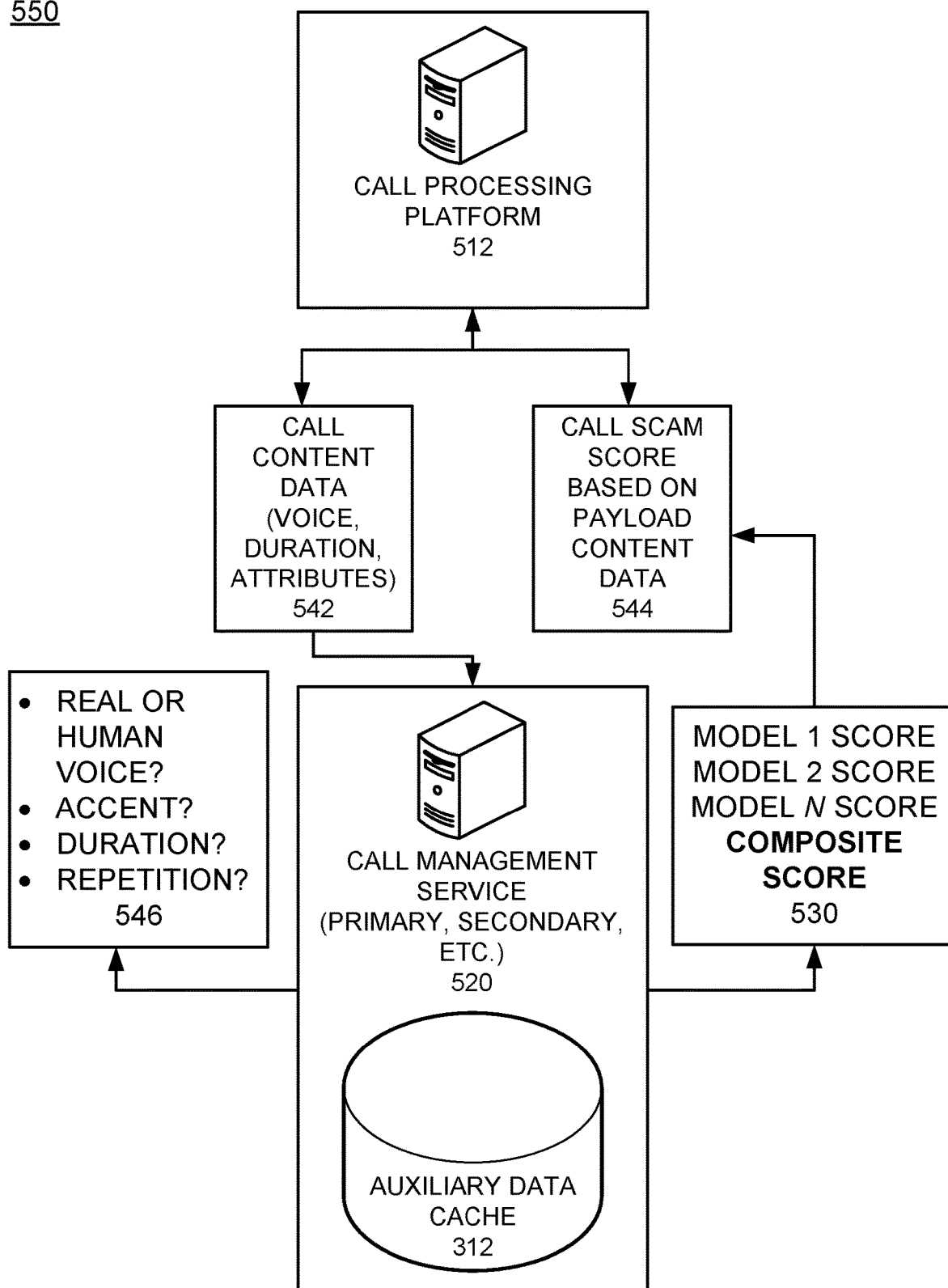
FIG. 5B illustrates a call content processing diagram for performing composite score analysis according to example embodiments.

FIG. 5B illustrates a call content processing diagram 550 for performing composite score analysis according to example embodiments. Referring to FIG. 5B, the call data may be analyzed for scam potential in an active call request by performing payload and/or call content 542 analysis to identify the content of the calls. Examples of content analysis include, voice vs. non-voice data, call duration, recorded voice vs. non-recorded voice data, dual-time multi-frequency selections (DTMF), words identified from the recorded call content, etc. If a call's content is identified as being predominantly recorded voice samples, short durations, repetitive content from a histogram sample or other DSP sample 546, then the call may be identified as scam or may be scored higher as having a higher scam likelihood from the content of the call 544.

FIG. 6A illustrates a set of call message parameters in an active call request according to example embodiments. Referring to FIG. 6A, there are numerous call parameters 600 in a single call. The call may be placed by any "A" caller, which may be identified as the caller that is calling a callee. The "A" caller may be identified simply by an assigned telephone number and may be dialing a single callee or "B" party/callee at any given call instance. Such parameters are fundamental call parameters 612 common to any call. Since this example is a SIP protocol call, there are specific SIP parameters which are analyzed and processed to identify call characteristics for call scam scoring and determinations on a call-by-call basis. Those skilled in the art will appreciate that other digital call platforms and protocols and parameters may be used to identify call characteristics and filter out certain likely scam callers. The procedures described may not be limited to merely SIP calling parameters.

In operation, certain common call characteristics may begin with a phone number of the "A" caller and a phone number of a "B" callee. Clearly, a scam caller will not continuously call the same "B" callee, but may be relying on a particular NPANXX call pattern of which the "B" callee is a candidate based on the first 6 digits of the "B" callee's telephone number. In general, an "A" caller is the first parameter to examine when collecting call data for a scam scoring model. Also, during subsequent calls which are compared to the scam model, the "A" caller will be a primary parameter to create a comprehensive score which may be an expression with multiple scoring parameters, the sum of which is the scam score. The scam score can then be compared to a threshold scam score to determine whether to assign the call to a scam prevention action, such as dropping the call or notifying the callee. During a call analysis, an "A" caller phone number may be identified over a fixed period, such as 24 hours to identify the number of calls made during such a time period. If that "A" caller telephone number exceeds a normal threshold of calls in that allotted period of time, the "A" caller may be identified as a number that is included on a call scam list of potential scammers. Historical call data may be collected over 30 days and applied as a comparison basis to any active call received at any time. The call data may be updated every 24 hours to create a new moving average of call parameters based on the last 30 days. A typical call scenario for any "A" caller may be no more than X calls per hour. If an "A" caller exceeds that number, then the scoring model may use the "A" caller parameter to increase the score of a call for subsequently received/identified calls originating from that "A" caller.

In general, the score for a single call may be based on a plurality of parameter screenings and sub-scores. For example, an "A" caller may be flagged as potential scammer and the identification of that caller may add a score of +20, another parameter used to cross-reference the potential scammer in the present call scenario may be the IP address. IP addresses 614 are identified from SIP signaling and may be used as a secondary parameter to further increase a scam score from an "A" caller. The IP address may be known from previous call audit data and may also be linked to potential scam callers based on their known carrier's and their carrier's IP addresses used by their internal servers/routers/switches, etc. The IP address could add another scoring parameter of +20 to the call score. Other parameters from a digital SIP call INVITE may include Max-Forwards 616 and content-length 618. Those additional sub-parameters tend to be similar for calls originated from a common carrier, a common location, etc., and thus during a call scoring scenario, the scam score may be +20 for having a max-forward and/or content-length score that is similar to a previously identified score associated with a potential scammer. If the scores of the sub-parameters were not the same or at least similar (+/−2, 3, etc.), then the score would not be incremented based on such additional parameters. However, in this example, if the phone call being screened at the present time had a history of a known scammer "A" caller, a known IP address, a known max-forwards count and a known content-length count, then the likelihood of the call being screened as scam would be high as the score would be +20(caller "A" number)+20 (known IP address), +20 (max-forwards) and +20 (content-length). Assuming a scam score requires a 50 or more, this particular call would be screened as scam for exceeding the minimum threshold score.

Figure 6B:
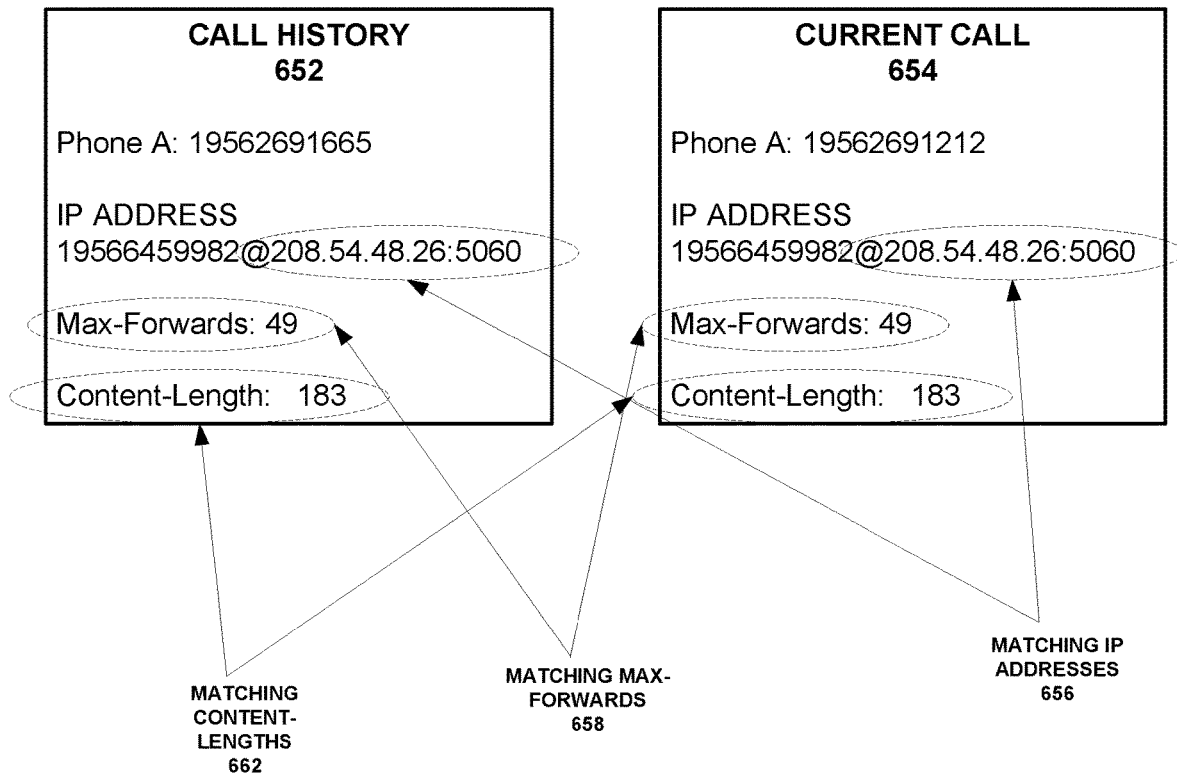
FIG. 6B illustrates a set of call message parameters being processed and compared to historical call data according to example embodiments.

FIG. 6B illustrates a set of call message parameters being processed and compared to historical call data according to example embodiments. Referring to FIG. 6B, the example 650 illustrates how the call history data 652 can be compared to a current call data 654. The example provides a different "A" caller number, however, call scammers may frequently use different numbers on a daily basis to increase their chances at not being identified by a call scam filter service. The other parameters are the same, and in this scenario, the IP address of one or more SIP parameters may match 656 a previously flagged scammer using such an IP address, whether the IP address is their own device or a server/router used by their carrier. The other parameters 662 and 658 are also identified as matched parameters, which increases the scam score assuming the call history 652 indicated that such sub-parameters are known for a particular "A" caller and/or IP address primary parameters, which would indicate a known scammer.

Another example for identifying an "A" caller and/or IP address as being associated with a potential scam caller may include identifying certain calling patterns, such as short call durations, large volume calling and/or a threshold number of call failures via SIP signaling, such as "400" or "500" SIP call errors which would result from call scripts identifying numbers which are no longer valid callee numbers but which were attempted by the "A" caller. A certain number of call errors (e.g., 400 and 500 SIP error messages) in a given period of time may dictate a scam caller criteria used to rate the current call as a likely scam call.

Figure 6C:
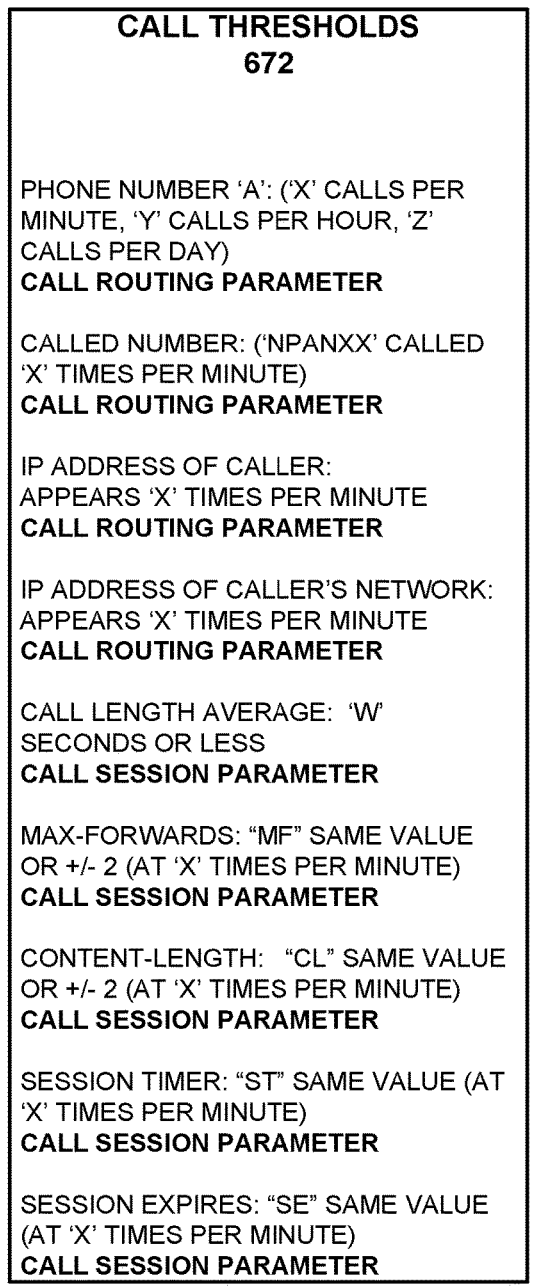
FIG. 6C illustrates an example of a current call having its call parameter data compared to established call parameter thresholds for scam scoring purposes according to example embodiments.
Figure 6C:
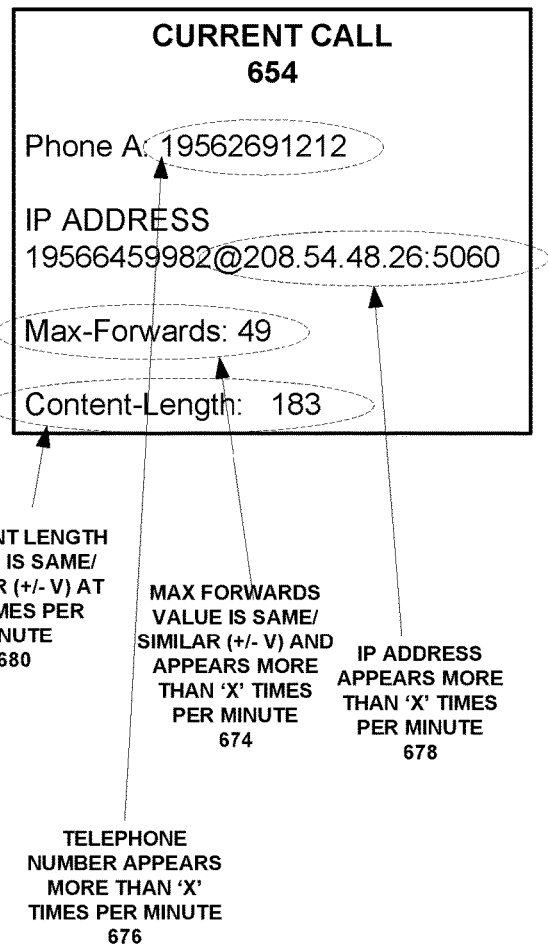

FIG. 6C illustrates an example of a current call having its call parameter data compared to established call parameter thresholds for scam scoring purposes according to example embodiments. Referring to FIG. 6C, the example 670 provides identifying various call parameter threshold data 672 stored in call management tables after call audit data is compiled, and comparing the suspect call scam data values/thresholds to current call data from an incoming call to determine whether the call should be blocked. As the established thresholds are applied to the active call data, previous call data may be identified and used to manipulate a counter which counts suspect call data instances including the current call to identify whether the current call 654 has exceeded a threshold. For example, certain thresholds may include call routing parameter-based thresholds, such as, phone number 'A' making 'X' calls per minute/hour/day, etc. Once the caller 'A' is identified as having made a threshold number of calls, the call 'A' telephone number may be linked to suspicious behavior and applied a weight as a scam caller. The telephone number being linked to excessive calls may alone invoke a weight that is higher than most or all other weights and designates the caller's number a scam caller based on the scam call threshold scale of a weight that is over the scam call value threshold for a summed score. For example, if a call is scored for various parameters and compared against various thresholds and rules, the sum of all suspicious parameters may be used as a scam call score. However, the call routing parameters, such as 'A' caller telephone number may be weighted higher with a larger weight than other parameters when computing the score.

Another call routing parameter may be a called number NPANXX, meaning specific called numbers that begins with the same 6 digits N-P-A-N-X-X. Scam callers may often seek to dial calls which have the same three, four, five, six, etc., digits in a sequential manner. Such detected call actions may be linked to suspicious behavior and may be identified by a counter measuring a total number of calls by a caller 'A' in a fixed time period, and the threshold 'X' times may be set to then trigger a scam call score weight be applied to all calls received beyond the threshold number of calls with those same 6 digits in a fixed time period. The weight applied may be a larger weight then other parameter weights, however, the weight applied in this example may still be less than the weight applied to a specific phone number designated as a scam caller since that weight may be the largest weight applied. Or, the weight applied may be the same as the phone number 'A' identified weight. Another call routing parameter may be the IP address of the caller's device, the caller's network devices (e.g., routers, switches, etc.) operating on the caller's carrier network, and/or the IP address of a called device. When those IP addresses are identified in call data over a fixed period of time and for an excessive number of instances, then the IP addresses may exceed a set threshold and be deemed potential scam identifiers which may be weighted with a weight that is less than or similar to the weights applied to the caller's number and/or called numbers linked to the caller.

In another example, the call session parameters may be SIP specific parameters which are identified as suspect/suspicious parameters from previous calls based on a threshold number of previous call parameters identified. For example, a call length parameter "W" as an average time measured for connected calls may establish a threshold time. When calls received are associated with a particular caller telephone number and/or IP address, etc., then the call session parameter of "W" seconds may be identified as the average length of call duration for that particular user, then the call may be weighted with a certain weight value as one parameter to increase the likelihood that the caller is a scam caller. Also, session call parameter values which are known to have been received from a particular caller or IP address, such as max-forwards "MF", content length "CL", session timer "ST" and/or session expires "SE", based on a previous number of calls over a fixed interval, may have been identified an excessive number of times over that interval. As a result, any time the incoming call has those SIP session parameter values, the call may be suspect/suspicious and additional weights may be applied corresponding to those session values. In general, the session parameters may be linked to lesser weight assignments since the session values are secondary in their priority to routing parameters.

In one example of a current call 654, a scam score for an incoming call may be determined by identifying a suspect caller's number "A" with a weight of 20, a suspect IP address associated with the caller, the caller's carrier network devices, and/or the callee with a weight of 20, an average call duration of the caller being identified as "7" seconds, and expected values for: MF, CL, ST and/or SE (or within a range +/−2 or less), each of which are 10 points. The combined scam score is then 20+20+10+10+10+10+10=90, and a scam call threshold may be any score over 40. In this example, the current call may only have a phone number of the caller identified 676, a max forwards value identified 674, an IP address 678 identified, and a content length identified 680. The identification process suggests the values are known for that particular caller via their phone number and/or their associated IP address, and then the secondary parameters are checked, which in this case are the max forwards and the content length. The scam score may be 20(known caller number)+20(known IP address)+10(known max forward value)+10(known content length value), for a total of 60. The threshold may only be 40, and thus in this case, the score is considered to be scam. The threshold values represent values which have been identified a certain number of times to reach a meet or exceed threshold status, in which case any time those values are received, they are identified as having exceeded the established threshold number of occurrences and thus will cause weighted values to be applied to the incoming call. A call that is not recognized by its parameters will receive scores of zeros until a next audit occurs and the values of incoming calls can be analyzed for adjustments to the existing thresholds to identify the suspect callers.

In another example embodiment, instead of SIP parameter analysis, other communication protocols and the respective call data may be analyzed for scam call detection. For example, the integrated services digital network (ISDN) user part or (ISUP) is part of a signaling system No. 7 (SS7) protocol hierarchy, which is used to set up telephone calls in the public switched telephone network (PSTN).

In operation, ISUP data traffic may, in some ways, be similar to SIP data traffic. For example, an INVITE message used in SIP is similar to an ISUP IAM message. Those skilled in the art may have knowledge of specifications on how to convert SIP to ISUP and ISUP to SIP. There are mandatory fields in ISUP and SIP and over 50 optional parameters that can be included in an ISUP initial address message (IAM). In general, various communication parameters in ISUP signaling elements of an ISUP IAM message are not applicable to SIP and therefore ISUP has more parameters which could be used to identify trends with call scams.

One example of ISUP signaling may provide:
service information octet
11.. ....=Network indicator: Reserved for national use (0x03)
..00 ....=Spare: 0x00
.... 0101=Service indicator: ISUP (0x05)
Routing label
.... .... .... .... ..10 1111 1000 0011=DPC: 12163
.... 1011 0100 0000 10.. .... .... ....=OPC: 11522
101 . .... .... .... .... ....=Signalling Link
Selector: 5
ISDN User Part
CIC: 213
Message type: Initial address (1)
Nature of Connection Indicators: 0x0
Mandatory Parameter: 6 (Nature of connection indicators)
.... ..00=Satellite Indicator: No Satellite circuit in connection (0x00)
.... 00..=Continuity Check Indicator: Continuity check not required (0x00)
...0 ....=Echo Control Device Indicator: Echo control device not included
Forward Call Indicators: 0xa001
Mandatory Parameter: 7 (Forward call indicators)
.... ....0 .... ....=National/international call indicator: Call to be treated as national call
..... .00.... .... .=End-to-end method indicator: No End-to-end method available (only link-by-link method available) (0x0000)=
.... 0... .... ....=Interworking indicator: no interworking encountered (No. 7 signalling all the way)
...0 .... .... ....=End-to-end information indicator: no end-to-end information available
..1. .... .... ....=ISDN user part indicator: ISDN user part used all the way
10.. .... .... ....=ISDN user part preference indicator: ISDN user part required all the way (0x0002)
.... .... .... ...1=ISDN access indicator: originating access ISDN
.... .... .... .00.=SCCP method indicator: No indication (0x0000)
Calling Party's category: 0xa (ordinary calling subscriber)
Mandatory Parameter: 9 (Calling party's category)
Calling Party's category: ordinary calling subscriber (0x0a)
Transmission medium requirement: 2 (64 kbit/s unrestricted)
Mandatory Parameter: 2 (Transmission medium requirement)

Transmission medium requirement: 64 kbit/s unrestricted (2)
Called Party Number: 4891F
Mandatory Parameter: 4 (Called party number)
Pointer to Parameter: 2
Parameter length: 5
1... ....=Odd/even indicator: odd number of address signals
.000 0001=Nature of address indicator: subscriber number (national use) (1)
1... ....=INN indicator: routing to internal network number not allowed
.001 ....=Numbering plan indicator: ISDN (Telephony) numbering plan (1)
Called Party Number: 4891F
.... 0100=Address signal digit: 4 (4)
1000....=Address signal digit: 8 (8)
.... 1001=Address signal digit: 9 (9)
0001 ....=Address signal digit: 1 (1)
.... 1111=Address signal digit: Stop sending (15)
E.164 Called party number digits: 4891F
Pointer to start of optional part: 7
Calling Party Number: 3933399708
Optional Parameter: 10 (Calling party number)
Parameter length: 7
0... ....=Odd/even indicator: even number of address signals
.000 0011=Nature of address indicator: national (significant) number (3)
0... ....=NI indicator: complete
.001 ....=Numbering plan indicator: ISDN (Telephony) numbering plan (1)
.... 01..=Address presentation restricted indicator: presentation restricted (1)
.... ..11=Screening indicator: network provided (3)
Calling Party Number: 3933399708
.... 0011=Address signal digit: 3 (3)
1001 ....=Address signal digit: 9 (9)
....0011=Address signal digit: 3 (3)
11 .=Address signal digit: 3 (3)
....0011=Address signal digit: 3 (3)
1011....=Address signal digit: 9 (9)
....1001=Address signal digit: 9 (9)
0111 ....=Address signal digit: 7 (7)
....0000=Address signal digit: 0 (0)
1000 ....=Address signal digit: 8 (8)
E.164 Calling party number digits: 3933399708
Optional forward call indicators: non-CUG call (128)
Optional Parameter: 8 (Optional forward call indicators)
Parameter length: 1
.... ..00=Closed user group call indicator: non-CUG call (0)
.... .0.=Simple segmentation indicator: no additional information will be sent
1... ....=Connected line identity request indicator: requested
Access transport (5 bytes length)
Optional Parameter: 3 (Access transport)
Parameter length: 5
Access transport parameter field (->Q.931)
Low-layer compatibility
Information element: Low-layer compatibility
Length: 3
...0 1000=Information transfer capability: Unrestricted digital information (0x08)
.00. ....=Coding standard: ITU-T standardized coding (0x00)

```
1.... ...=Extension indicator: last octet
 ...1 0000=Information transfer rate: 64 kbit/s (0x10)
 .00. ....=Transfer mode: Circuit mode (0x00)
 1... ....=Extension indicator: last octet
 ...0 0110=User information layer 1 protocol: Recom-
   mendation H.223 and H.245 (0x06)
 1... ....=Extension indicator: last octet
User service information, (3 bytes length)
 Optional Parameter: 29 (User service information)
 Parameter length: 3
 User service information (->Q.931 Bearer_capability)
 ...0 1000=Information transfer capability: Unrestricted
   digital information (0x08)
 .00. ....=Coding standard: ITU-T standardized coding
   (0x00)
 1... ....=Extension indicator: last octet
 ...1 0000=Information transfer rate: 64 kbit/s (0x10)
 .00. ....=Transfer mode: Circuit mode (0x00)
 1... ....=Extension indicator: last octet
 ...0 0110=User information layer 1 protocol: Recom-
   mendation H.223 and H.245 (0x06)
 1... ....=Extension indicator: last octet
Propagation delay counter=100 ms
 Optional Parameter: 49 (Propagation delay counter)
 Parameter length: 2
 Propagation delay counter=100 ms
Location number: 00600001
 Optional Parameter: 63 (Location number)
 Parameter length: 6
 0... ....=Odd/even indicator: even number of address sig-
   nals
 .000 0011=Nature of address indicator: national (signifi-
   cant) number (3)
 1... ....=INN indicator: routing to internal network number
   not allowed
 .001 ....=Numbering plan indicator: ISDN (Telephony)
   numbering plan (1)
 .... 00..=Address presentation restricted indicator: presen-
   tation allowed (0)
 .... ..11=Screening indicator: network provided (3) Loca-
   tion number: 00600001
 .... 0000=Address signal digit: 0 (0)
 00 .=Address signal digit: 0 (0)
 .... 0110=Address signal digit: 6 (6)
 00 .=Address signal digit: 0 (0)
 .... 0000=Address signal digit: 0 (0)
 00 .=Address signal digit: 0 (0)
 .... 0000=Address signal digit: 0 (0)
 01 .=Address signal digit: 1 (1)
Parameter Type unknown/reserved (5 Bytes)
 Optional Parameter: 244 (unknown)
 Parameter length: 5
Parameter compatibility information (2 bytes length)
 Optional Parameter: 57 (Parameter compatibility infor-
mation)
 Parameter length: 2
 Upgraded parameter no: 1=unknown (244)
 Instruction indicators: 0x90
 .... ...0=Transit at intermediate exchange indicator: Transit
   interpretation
 .... ..0.=Release call indicator: do not release call
 .... .0..=Send notification indicator: do not send notifica-
   tion
 .... 0...=Discard message indicator: Do not discard mes-
   sage (pass on)
 ...1 ....=Discard parameter indicator: Discard parameter
 .00. ....=Pass on not possible indicator: Release call (0x00)
 1... ....=Extension indicator: last octet
End of optional parameters (0).
```

Any of the ISUP parameters included in the above example of call data, may be identified, tracked, compared to certain frequency/filtering criteria and may be flagged as indicative of a scam caller depending on the parameter analysis being used to identify the scam caller likelihood. Similar to the SIP scenario, the ISUP parameters may be referenced, tracked and processed to identify scam likely behavior based on known filtering criteria. The identified data can then be shared with network servers throughout a carrier infrastructure to apply scam identification to subsequent calls.

Figure 7A:
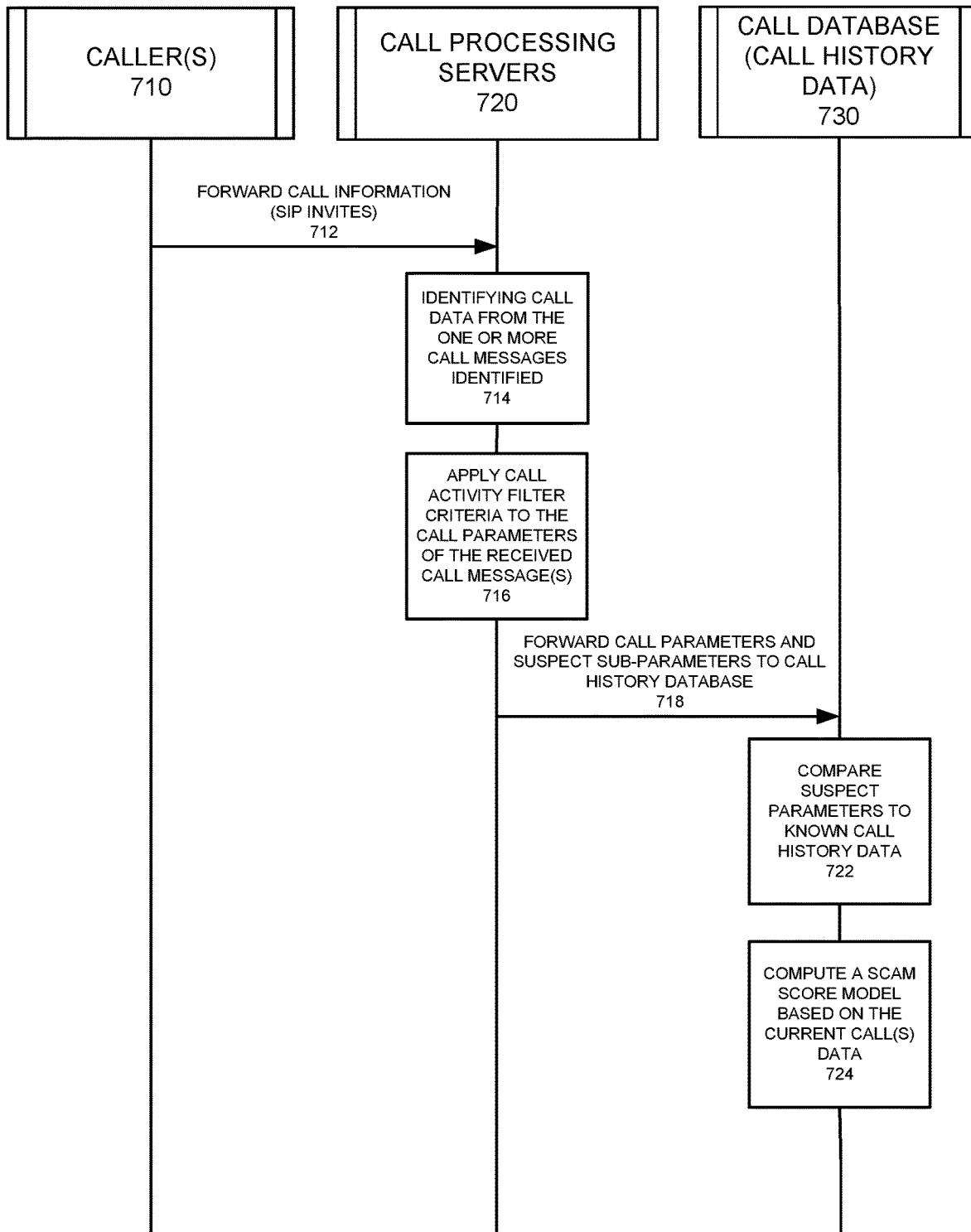
FIG. 7A illustrates a call system configuration for monitoring call data and obtaining call scoring model data according to example embodiments.

FIG. 7A illustrates a call system configuration for monitoring call data and obtaining call scoring model data according to example embodiments. Referring to FIG. 7A, the system configuration 700 may include creating trainer framework for call processing clients. The process may include receiving one or more data messages from callers 710 as call data to be analyzed 712 via the call processing server(s) 720. The plurality of calls and corresponding call data (i.e., call parameters) from the one or more messages are identified 714 and a call activity filter criteria may be created and applied 716 so that the suspect parameters associated with a scam call or potentially associated with a scam call can be logged and added to the active filtering call parameter data for subsequent call interrogation. The parameters which are considered likely or common to be scam are identified based on other historical data or by threshold comparisons for instances of such data which is considered to be exceeding an acceptable threshold (e.g., calls per day, calls per hour, same "a" caller, similar NPANXX call patterns over a certain number, etc.) Those suspect sub-sets of the call parameters which indicate an elevated likelihood of a call scam are used as a basis for a scam score model which may be a set of call parameters and thresholds which are considered to be suspect and which must be monitored via a scam score model filtering procedure for incoming calls received after the criteria is created. Also, the parameters may be updated one at a time and/or intermittently so that all the call parameters, which are part of the scam score model and corresponding filter criteria, are updated on an as needed basis. The method may also include forwarding the plurality of call parameters and the suspect sub-set of call parameters 718 to one or more call data tables stored in the database 730, so the updates can be written to a call scam scoring table. When the suspect parameters are identified, those parameters can be compared 722 to known scam call data and thresholds to identify whether the new parameters should be used as additional filtering criteria since the tables were last updated on the call processing servers 720. The updated scoring model 724 can then be redistributed to the servers for subsequent call monitoring of subsequently received calls. The tables may include scam designation criteria, which may include threshold scores for matching incoming call data.

The one or more data messages include SIP INVITE data messages, and the plurality of call parameters may include, but are not limited to one or more of: a caller telephone number, a callee telephone number, an IP address of a caller device, an IP address of a callee device, an IP address of a device operating on the caller's network, an IP address of a device operating on the callee's network, an average call duration of calls associated with the callee telephone number, and other SIP specific parameters identified at least in FIG. 6A. The suspect sub-set of call parameters may include, in one example, a threshold number of call occurrences associated with a caller identity over a fixed period of time. The identifying of the plurality of call parameters from the call data is performed for the fixed period of time. The call activity filter criteria includes a plurality of thresholds which when exceeded during the fixed period of time triggers the assigning of the one or more scam designation threshold scores to the suspect sub-set of the call parameters.

The method may also include transmitting the one or more call data tables to call processing servers, and publishing the one or more call data tables to a call monitoring application operating on the call processing servers. The call data tables are based on call data identified over a fixed time interval of N minutes, wherein N is an integer between 1-10 minutes and/or 1-30 days.

Figure 7B:
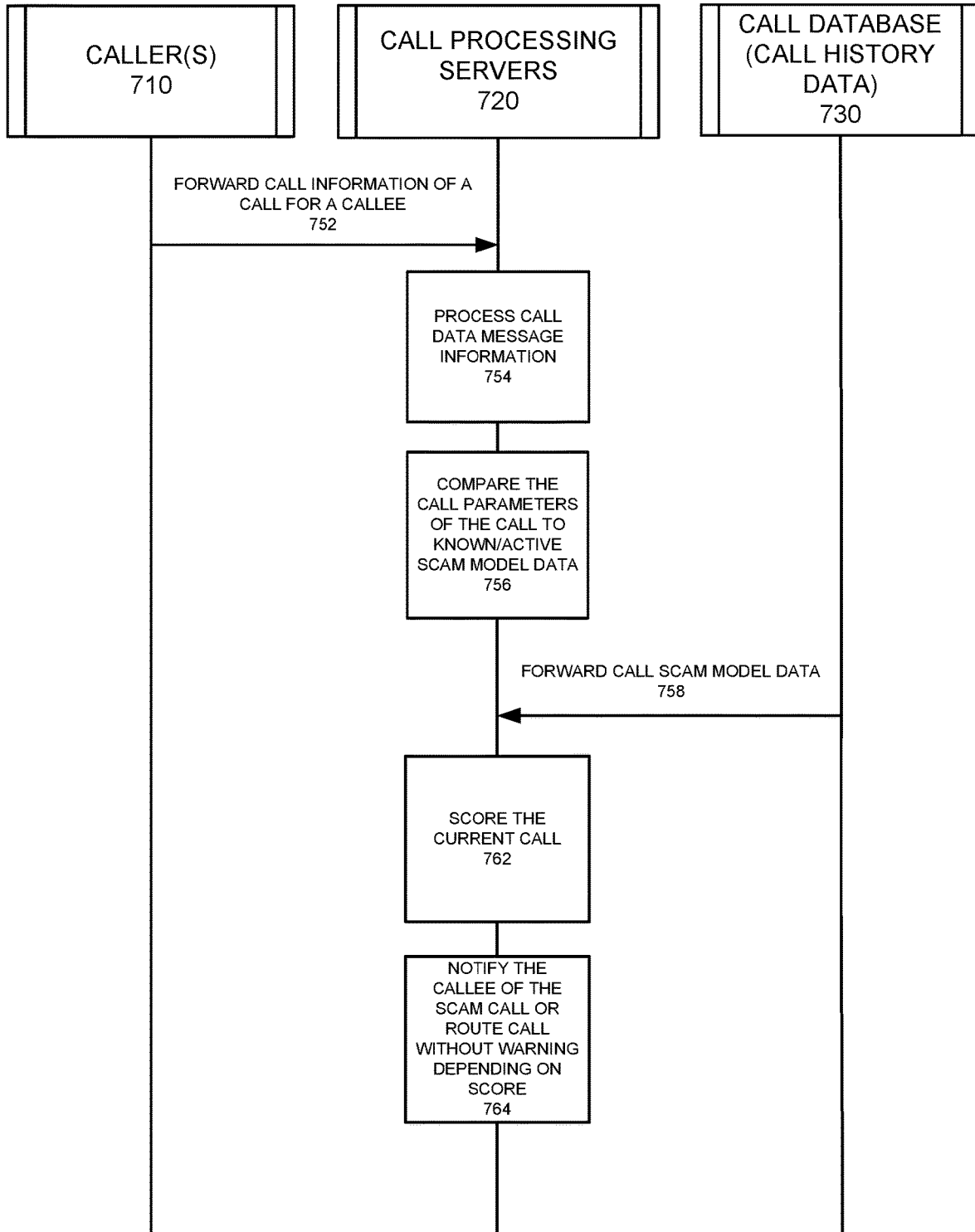
FIG. 7B illustrates a call system configuration for applying call data to current calls according to example embodiments.

FIG. 7B illustrates a call system configuration for applying call data to current calls according to example embodiments. Referring to FIG. 7B, the system may provide an example method of operation 750 that includes identifying a call from a caller and destined for a callee 752, receiving a data message associated with the call and processing the data message information 754 to identify one or more call parameters. The call parameters of the call may be compared with one or more call parameters associated with an active call scam model 756 applied by the call processing server 720. The call database 730 may forward the necessary data 758 so the server 720 can match the model data to the active call data received. Once the comparison is performed, the method may provide determining a scam score for the call based on the comparing of the one or more call parameters to the active call scam model applied by the call processing server 762, and then a decision can be made as whether to notify the callee that the call is a scam based on the scam score based on the score 764.

The method may further include determining whether the scam score exceeds a scam score threshold, responsive to determining the scam score exceeds a scam score threshold, tagging the call with an identifier, and performing at least one of notifying the callee that the call is a scam call, blocking the call, and directing the call to voice mail, based on the tagged identifier. When determining the scam score for the call the method may include determining a plurality of scam scores based on a plurality of active call scam models assigned to the call processing server, determining a composite score based on the plurality of scam scores from all the different servers, and applying the composite score as the scam score. Determining the scam score based on the active model applied by the call processing server is performed while the call is being processed and within a threshold call processing time frame. The method may also include tagging the call to be one or more of blocked, forwarded to voicemail, and accepted by the call recipient prior to connecting the call to a call recipient device of the callee. The scam score is further computed by comparing the caller number to a list of known scam caller telephone numbers and based on call durations associated with the caller telephone number. The data message includes a SIP INVITE message and the one or more call parameters include SIP call parameters.

Figure 7C:
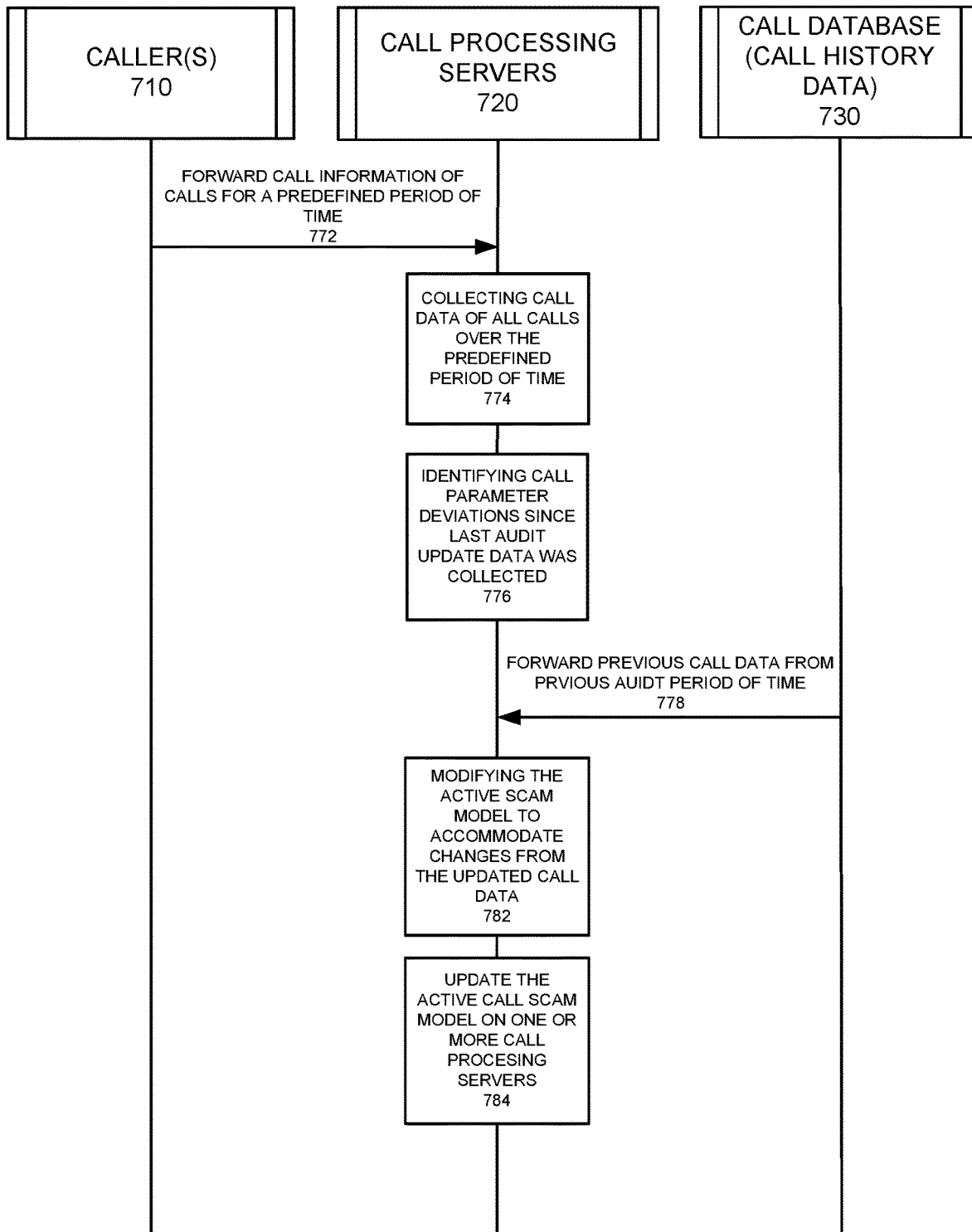
FIG. 7C illustrates a call system configuration for auditing call data and obtaining updated scoring model data for call scam filtering according to example embodiments.

FIG. 7C illustrates a call system configuration 770 for auditing call data and obtaining updated scoring model data for call scam filtering according to example embodiments. Referring to FIG. 7C, the system may support a method of operation which includes forwarding call information of various calls over a predefined period of time 772, collecting call metric data over a predefined period of time for a plurality of identified calls 774, querying the call metric data to identify whether one or more call filtering criteria parameters require changes, determining one or more call filtering criteria parameters require changes based on a deviation from one or more expected call metric data values included in the call metric data 776. The deviations may be identified by comparing previous call data 778 and then modifying one or more of the call filtering criteria parameters 782, and updating an active call scam model stored on a call processing server based on the one or more call filtering parameters 784.

The updating of the active call scam model occurs every N minutes, wherein N is an integer equal to 1-10 minutes. The updating of the active call scam model occurs by updating one or more scam call data tables stored on the call processing server. The predefined period of time occurs every M days, wherein M is an integer equal to 30-90 days. The call metric data includes one or more of a number of calls per day, a percentage of calls which were blocked per day, a historic percentage of calls which were blocked on one or more previous days, a timestamp of blocked calls, phone number occurrences of callers, phone numbers occurrences of callees, local exchange routing guide (LERG) information, a first call scam model average score assigned to calls, a second call scam model average score assigned to calls. The deviation from the one or more expected call metric data values included in the call metric data comprises one or more actual call metric data values being less than or greater than a deviation threshold value from the one or more expected call metric data values. The collecting of the call metric data over the predefined period of time for the plurality of identified calls is performed to a plurality of call processing servers each with unique call metric data.

Figure 7D:
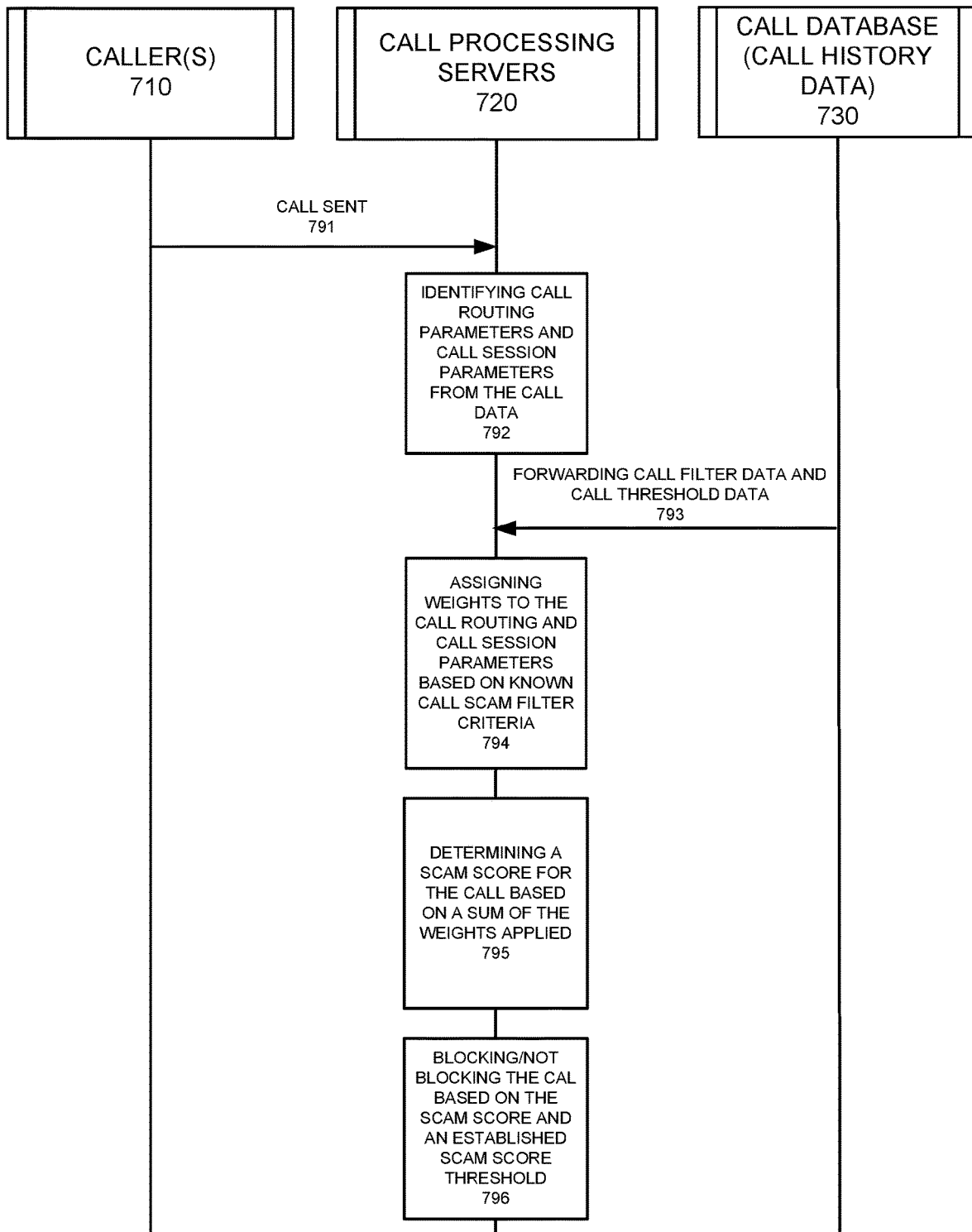
FIG. 7D illustrates a call system configuration for applying call management scam filtering to call data for an incoming call according to example embodiments.

FIG. 7D illustrates a call system configuration for applying call management scam filtering to call data for an incoming call according to example embodiments. Referring to FIG. 7D, the method 790 may include identifying call data associated with a received call sent 791 from a caller 710, identifying a plurality of call parameters from the call data, the plurality of call parameters including one or more call routing parameters associated with call routing of the call and one or more call session parameters associated with a call session of the call 792, forwarding call filter data and call threshold data 793 which is based on known call scam calls in recent scam builds which apply scam filter criteria. The method may also include assigning weights to one or more of the call routing parameters and the call session parameters 794, determining a scam score for the call based on a sum of the weights applied to the call routing parameters and the call session parameters 795, and blocking the call when the scam score is greater than or equal to a predetermined threshold scam score 796. The method may also include comparing the one or more call routing parameters to one or more call routing parameter thresholds, and applying weights to the call routing parameters which meet or exceed the one or more call routing parameter thresholds.

The method may also include comparing the one or more call session parameters to one or call session parameter thresholds among the call parameters, and applying weights to the call session parameters which meet or exceed the one or more call session parameter thresholds. The weights applied to the call session parameters, in one example, are lower valued weights than the weights applied to the call routing parameters. The call session parameters include one or more session initiation protocol (SIP) specific parameters comprising one or more of maximum forwards, timer values, session expires, and content length. The call routing parameters include one or more of a caller phone number, a specific 3-6 digit 'NPA-NXX' called number, an IP address of the caller, an IP address of a routing device on the caller's carrier network, and an IP address of a callee. The call routing parameters and the call session parameters which do not meet or exceed corresponding call routing parameter thresholds and call session parameter thresholds are not assigned weights.

Figure 8:
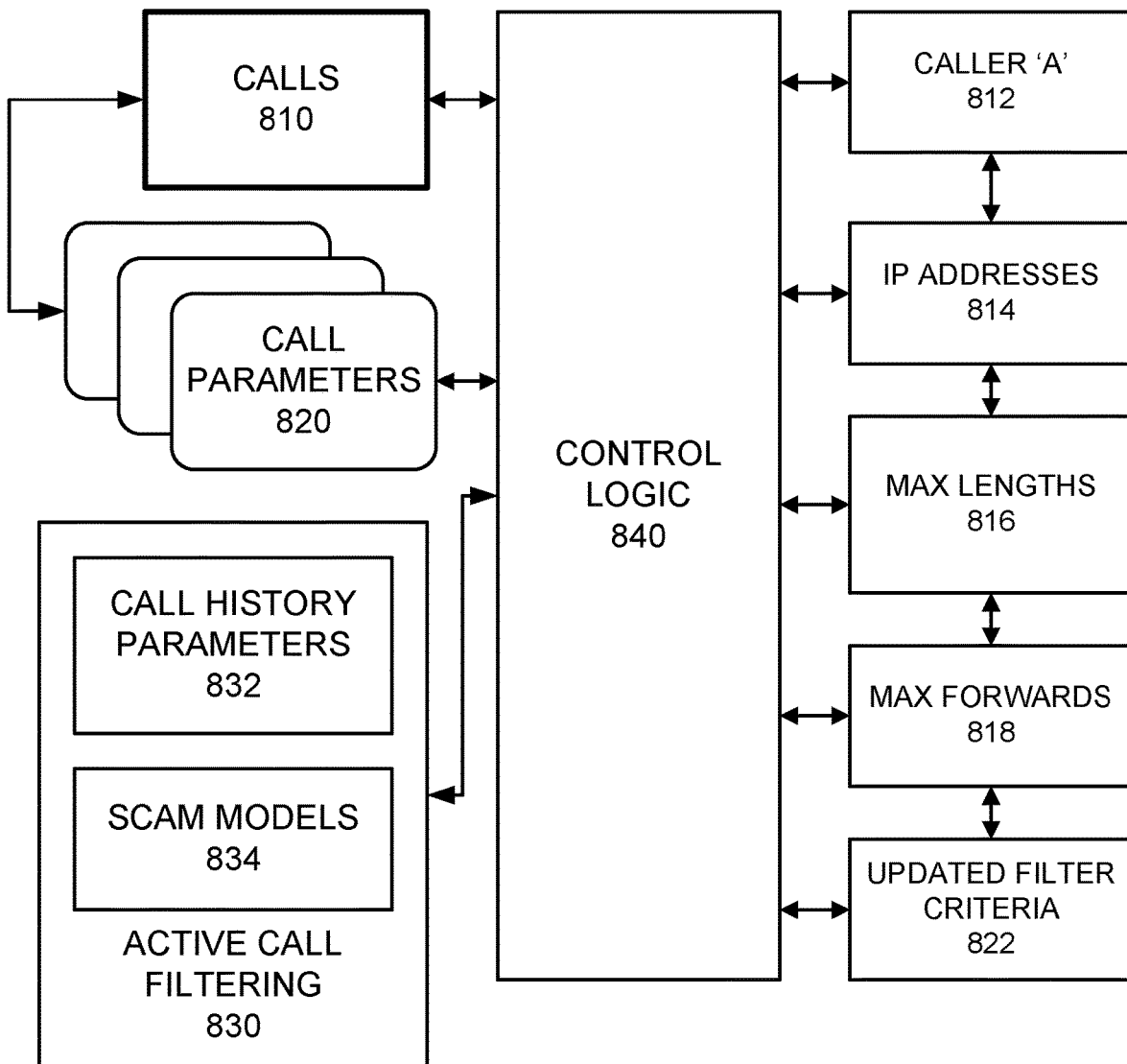
FIG. 8 illustrates a logic diagram with example data input and output parameters for performing call processing according to example embodiments.

FIG. 8 illustrates a logic diagram with example data input and output parameters for performing call processing according to example embodiments. Referring to FIG. 8, the control logic platform 800 includes a control logic module/processor 840 which is responsible for receiving input data, such as calls 810, the call parameters 820, retrieved call data 832, scam models 834, active call filtering data 830, etc., as conditional data used to apply to the call data that is received to identify call parameters and call scam scores for call filtering. The output of the logic 840 results in certain parameters, such as caller 'A' information 812, IP address information 814, max lengths 816, max forwards 818 and updated filter criteria 822. The updated data can be used to filter new calls for scam potential and the active call parameters can be screened for suspicious activity.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 9:
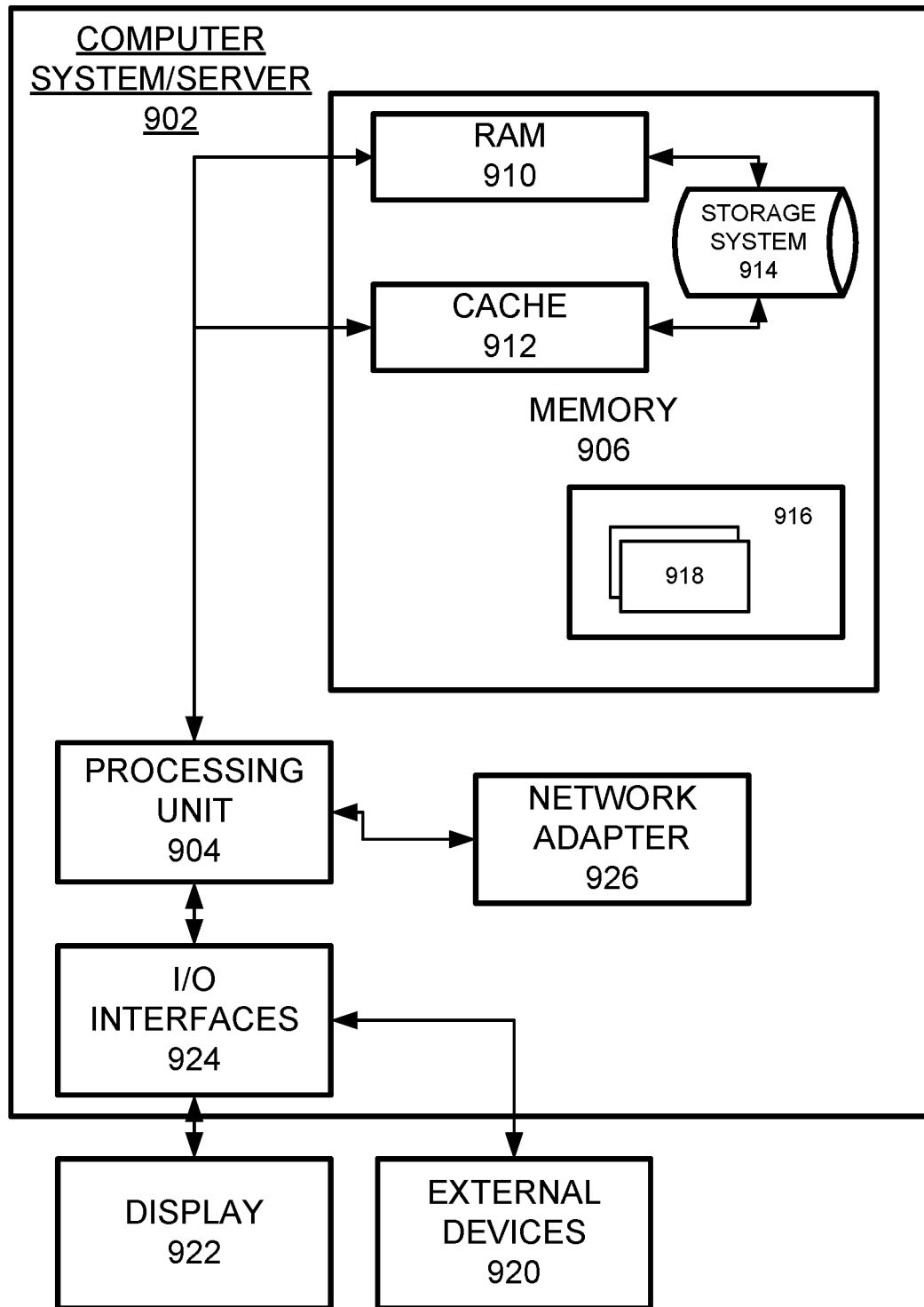
FIG. 9 illustrates an example network entity device configured to store instructions, software, and corresponding hardware for executing the same, according to example embodiments of the present application.

FIG. 9 is not intended to suggest any limitation as to the scope of use or functionality of embodiments of the application described herein. Regardless, the computing node 900 is capable of being implemented and/or performing any of the functionality set forth hereinabove.

In computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving a call message associated with a call from a caller to a callee;
identifying, via a call processing server, one or more call parameters from the call message;
comparing the one or more call parameters to an active call scam model applied by the call processing server to identify a plurality of the call parameters each of which are contributing a number of points to a total scam score associated with each call having a caller telephone number and placed by a caller device over a period of time, wherein the plurality of call parameters comprise an IP address contributing a first amount of points to the total scam score and a call message attribute parameter identifying one or more protocol specific attributes associated with the call parameter and contributing a second amount of points to the total scam score;
determining a scam score for the call based on the comparing to the active call scam model; and determining whether to notify the callee that the call is a scam based on the scam score.

2. The method of claim 1, further comprising:
determining whether the scam score exceeds a scam score threshold.

3. The method of claim 2, further comprising:
responsive to determining the scam score exceeds a scam score threshold, tagging the call with an identifier; and
performing at least one of notifying the callee that the call is a scam call, blocking the call, and directing the call to voice mail, based on the tagged identifier.

4. The method of claim 1, wherein determining the scam score for the call comprises determining a plurality of scam scores based on a plurality of active call scam models assigned to the call processing server;
determining a composite score based on the plurality of spam scores; and
applying the composite score as the scam score.

5. The method of claim 1, wherein the determining the scam score based on the active model applied by the call processing server is performed while the call is being processed and within a threshold call processing time frame; and
tagging the call to be one or more of blocked, forwarded to voicemail, and accepted by the call recipient prior to connecting the call to a call recipient device of the callee.

6. The method of claim 1, wherein the scam score is further computed by comparing the caller number to a list of known scam caller telephone numbers and based on call durations associated with the caller telephone number.

7. The method of claim 1, wherein the call message comprises a SIP INVITE message and the one or more call parameters comprise SIP call parameters.

8. An apparatus comprising:
a receiver configured to receive a call message associated with a call from a caller to a callee;
a processor configured to
identify one or more call parameters from the call message;
compare the one or more call parameters to an active call scam model applied by the call processing server to identify a plurality of the call parameters each of which are contributing a number of points to a total scam score associated with each call having a caller telephone number and placed by a caller device over a period of time, wherein the plurality of call parameters comprise an IP address which contributes a first amount of points to the total scam score and a call message attribute parameter which identifies one or more protocol specific attributes associated with the call parameter and contributes a second amount of points to the total scam score;
determine a scam score for the call based on the comparison to the active call scam model; and
determine whether to notify the callee that the call is a scam based on the scam score.

9. The apparatus of claim 8, wherein the processor is further configured to determine whether the scam score exceeds a scam score threshold.

10. The apparatus of claim 9, wherein the processor is further configured to responsive to the scam score being determined to have exceeded a scam score threshold, tag the call with an identifier; and
perform at least one of notify the callee that the call is a scam call, blocking the call, and direct the call to voice mail, based on the tagged identifier.

11. The apparatus of claim 8, wherein the scam score is determined for the call by a determination of a plurality of scam scores based on a plurality of active call scam models assigned to the call processing server, and wherein the processor is further configured to determine a composite score based on the plurality of spam scores; and
apply the composite score as the scam score.

12. The apparatus of claim 8, wherein the scam score is determined based on the active model applied by the call processing server, which is performed while the call is being processed and within a threshold call processing time frame; and wherein the processor is further configured to tag the call to be one or more of blocked, forwarded to voicemail, and accepted by the call recipient prior to the call being connected to a call recipient device of the callee.

13. The apparatus of claim 8, wherein the scam score is further computed by the caller number being compared to a list of known scam caller telephone numbers, and based on call durations associated with the caller telephone number.

14. The apparatus of claim 8, wherein the call message comprises a SIP INVITE message and the one or more call parameters comprise SIP call parameters.

15. A non-transitory computer readable storage medium configured to store instructions that when executed cause a processor to perform:
receiving a call message associated with a call from a caller to a callee;
identifying, via a call processing server, one or more call parameters from the call message;
comparing the one or more call parameters to an active call scam model applied by the call processing server to identify a plurality of the call parameters each of which are contributing a number of points to a total scam score associated with each call having a caller telephone number and placed by a caller device over a period of time, wherein the plurality of call parameters comprise an IP address contributing a first amount of points to the total scam score and a call message attribute parameter identifying one or more protocol specific attributes associated with the call parameter and contributing a second amount of points to the total scam score;
determining a scam score for the call based on the comparing to the active call scam model; and
determining whether to notify the callee that the call is a scam based on the scam score.

16. The non-transitory computer readable storage medium of claim 15, wherein the processor is further configured to perform:
determining whether the scam score exceeds a scam score threshold.

17. The non-transitory computer readable storage medium of claim 16, wherein the processor is further configured to perform:
responsive to determining the scam score exceeds a scam score threshold, tagging the call with an identifier; and
performing at least one of notifying the callee that the call is a scam call, blocking the call, and directing the call to voice mail, based on the tagged identifier.

18. The non-transitory computer readable storage medium of claim 15, wherein determining the scam score for the call comprises determining a plurality of scam scores based on a plurality of active call scam models assigned to the call processing server; and wherein the processor is further configured to perform
determining a composite score based on the plurality of spam scores; and
applying the composite score as the scam score.

19. The non-transitory computer readable storage medium of claim 15, wherein the determining the scam score based on the active model applied by the call processing server is performed while the call is being processed and within a threshold call processing time frame, and wherein the processor is further configured to perform tagging the call to be one or more of blocked, forwarded to voicemail, and accepted by the call recipient prior to connecting the call to a call recipient device of the callee.

20. The non-transitory computer readable storage medium of claim 15, wherein the scam score is further computed by comparing the caller number to a list of known scam caller telephone numbers and based on call durations associated with the caller telephone number.

* * * * *